(12) United States Patent
Meier et al.

(10) Patent No.: US 6,561,428 B2
(45) Date of Patent: May 13, 2003

(54) IMAGING DEVICE HAVING INDICIA-CONTROLLED IMAGE PARSING MODE

(75) Inventors: Timothy P. Meier, Camillus, NY (US); James Rosetti, Auburn, NY (US); Andrew Longacre, Jr., Skaneateles, NY (US); Robert M. Hussey, Camillus, NY (US); Charles P. Barber, Fayetteville, NY (US); Carl W. Gerst, III, Boston, MA (US)

(73) Assignee: Hand Held Products, Inc., Skaneatles Falls, NY (US)

( * ) Notice: Subject to any disclaimer, the term of this patent is extended or adjusted under 35 U.S.C. 154(b) by 0 days.

(21) Appl. No.: 09/954,081

(22) Filed: Sep. 17, 2001

(65) Prior Publication Data
US 2002/0104884 A1 Aug. 8, 2002

Related U.S. Application Data

(63) Continuation of application No. 08/953,195, filed on Oct. 17, 1997, now Pat. No. 6,298,176.
(60) Provisional application No. 60/309,155, filed on Jul. 31, 2001.

(51) Int. Cl.⁷ .................................................. G06K 9/22
(52) U.S. Cl. ............................ 235/462.25; 235/462.1; 235/462.08; 235/462.09; 235/472.01
(58) Field of Search ....................... 235/462.01, 472.01, 235/375, 454, 462.25

(56) References Cited

U.S. PATENT DOCUMENTS

| | | |
|---|---|---|
| 5,039,847 A | 8/1991 | Morii et al. |
| 5,120,940 A | 6/1992 | Willsie |
| 5,243,655 A | 9/1993 | Wang |
| 5,262,623 A | 11/1993 | Batterman et al. |
| 5,304,786 A | 4/1994 | Pavlidis et al. |
| 5,337,361 A * | 8/1994 | Wang et al. ............. 380/51 |
| 5,399,846 A | 3/1995 | Pavlidis et al. |
| 5,471,533 A | 11/1995 | Wang et al. |
| 5,489,158 A | 2/1996 | Wang et al. |
| 5,504,322 A | 4/1996 | Pavlidis et al. |
| 5,506,697 A | 4/1996 | Li et al. |
| 5,513,017 A | 4/1996 | Knodt et al. |
| 5,550,366 A | 8/1996 | Roustaei |
| 5,557,091 A | 9/1996 | Krummel |
| 5,635,697 A | 6/1997 | Shellhammer et al. |
| 5,644,408 A | 7/1997 | Li et al. |
| 5,710,419 A | 1/1998 | Wang et al. |
| 5,760,382 A | 6/1998 | Li et al. |
| 5,796,090 A | 8/1998 | Pavlidis et al. |
| 5,818,528 A * | 10/1998 | Roth et al. ............. 348/364 |

(List continued on next page.)

FOREIGN PATENT DOCUMENTS

| | | |
|---|---|---|
| EP | 0 439 682 B1 | 7/1996 |
| EP | 0733 991 B1 | 4/1999 |

OTHER PUBLICATIONS

PCT International Search Report for International Application No. PCT/US02/29281 mailed Dec. 2, 2002.

* cited by examiner

Primary Examiner—Michael G. Lee
Assistant Examiner—Ahshik Kim
(74) Attorney, Agent, or Firm—Wall Marjama & Bilinski LLP; George S. Blasiak

(57) ABSTRACT

The invention relates to a system for processing image data corresponding a scene comprising an imaging device and an image reading instruction indicia. In accordance with the invention, image data corresponding to a scene comprising an image reading instruction indicia is processed in a manner that depends on features of the image reading instruction indicia. If the image reading instruction indicia is of a type whose size, scaling, orientation, and distortion can be determined, scaling, orientation, and distortion characteristics determined from the image reading instruction indicia can be used to improve the image reading process.

20 Claims, 17 Drawing Sheets

U.S. PATENT DOCUMENTS

| | | |
|---|---|---|
| 5,837,986 A | 11/1998 | Barile et al. |
| 5,880,453 A | 3/1999 | Wang et al. |
| 5,974,202 A | 10/1999 | Wang et al. |
| 5,992,753 A * | 11/1999 | Xu ........................ 235/462.01 |
| 6,002,491 A | 12/1999 | Li et al. |
| 6,076,731 A * | 6/2000 | Terrell ........................ 235/454 |
| 6,212,504 B1 * | 4/2001 | Hayosh ........................ 705/64 |
| 6,298,176 B2 * | 10/2001 | Longacre, Jr. et al. ...... 382/213 |
| 6,330,975 B1 * | 12/2001 | Bunte et al. ............ 235/472.01 |

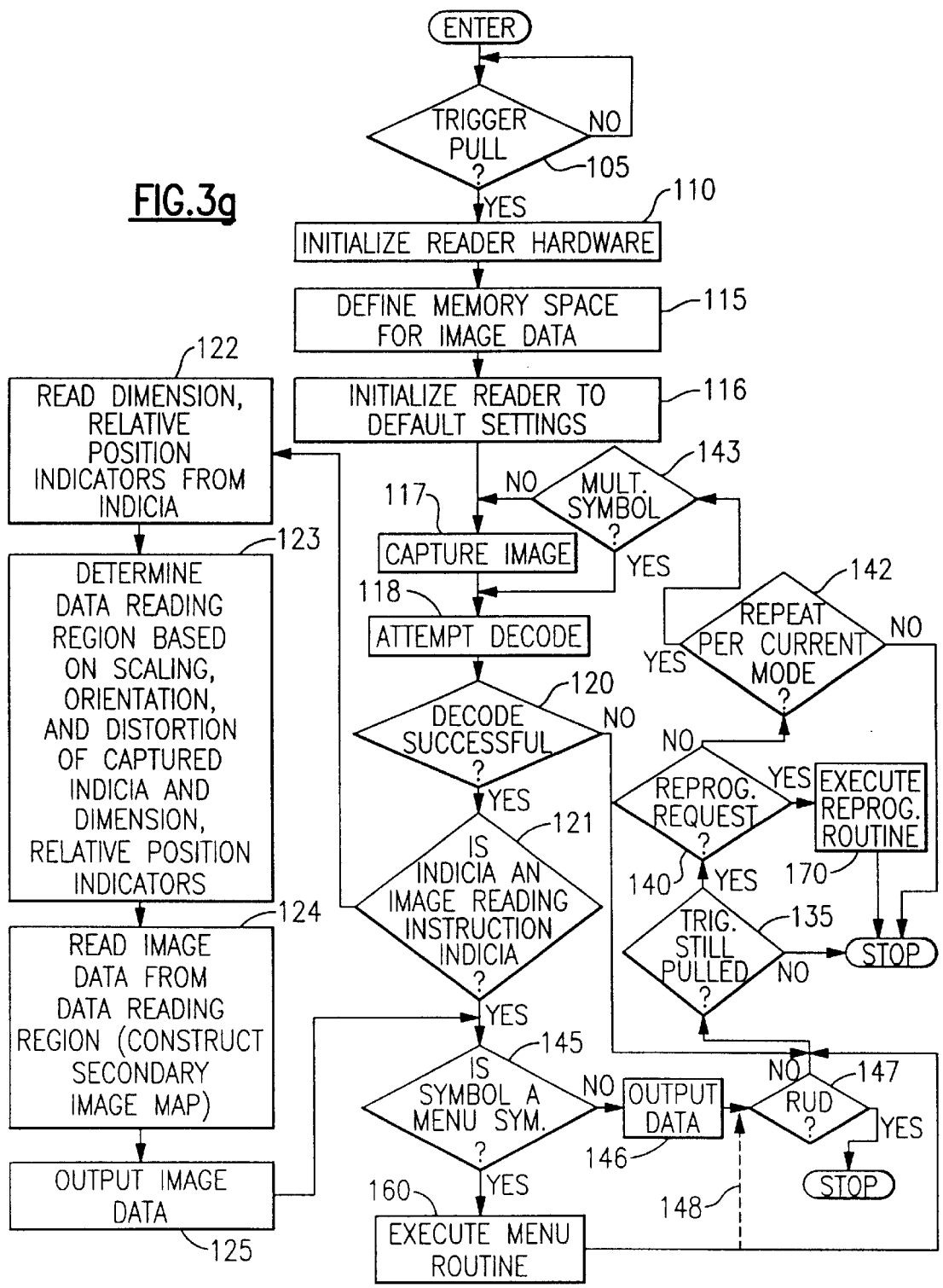

| INDICIA STYLE (IDENTIFIER) | INTEREST REGION SIZE | OUTPUT LOCATION |
|---|---|---|
| BOX-ONLY | 3" x 1" | INTEGRATED MEMORY |
| BOX+LOGO1 | 2.5" x 1.75" | NONINTEGRATED LOCAL HOST PROCESSOR SYSTEM MEMORY |
| BOX+LOGO2 | 3.25" x 1" | REMOTE HOST PROCESSOR SYSTEM MEMORY |
| SIGNATURE-ONLY | 2.75" x 1.25" | INTEGRATED LOCAL HOST PROCESSOR SYSTEM MEMORY |
FIG.7
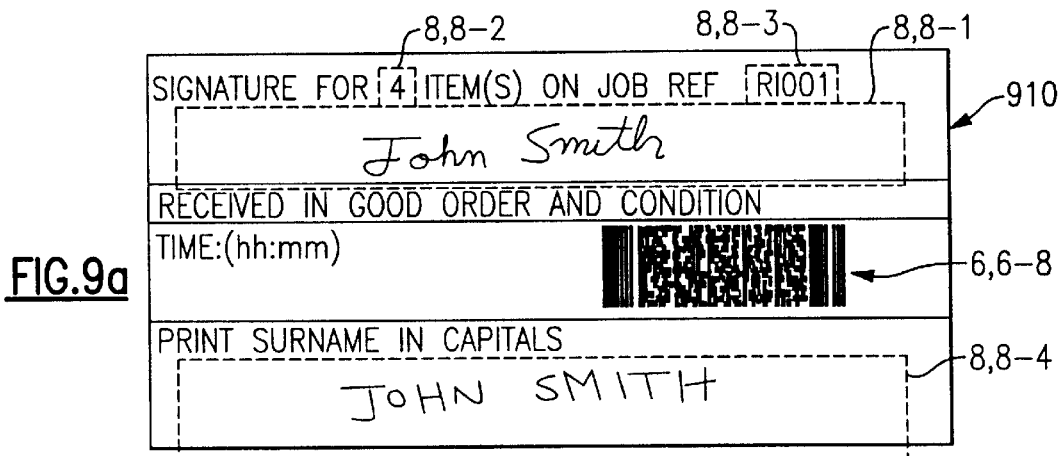
FIG.9a
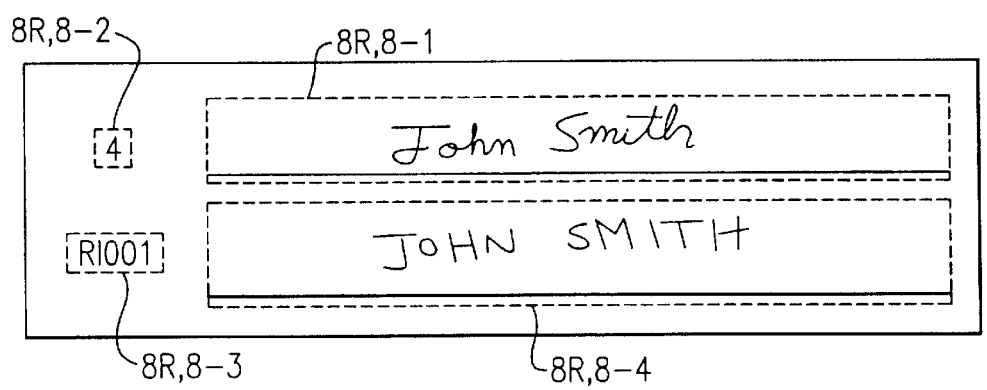
FIG.9b

IMAGING DEVICE HAVING INDICIA-CONTROLLED IMAGE PARSING MODE

CROSS-REFERENCE TO RELATED APPLICATIONS

The present application is a continuation of application Ser. No. 08/953,195, filed Oct. 17, 1997, now U.S. Pat. No. 6,298,176, entitled "Symbol Controlled Image Data Reading System." The priorities of the above applications are claimed and the above application is incorporated herein by reference. This application also claims priority of Provisional Patent Application Serial No. 60/309,155, filed Jul. 31, 2001, entitled "Imaging Device Having Indicia-Controlled Image Parsing Mode."

FIELD OF THE INVENTION

The present invention relates to imaging devices in general and in particular to imaging devices having an image parsing operating mode.

BACKGROUND OF THE INVENTION

Systems have been developed in which representations of signatures or other localized interest area indicia are captured with use of an imaging device. Problems have been noted with the system however. Many interest area image capture devices require specialized docking apparatuses, for holding an indicia bearing substrate in a certain axial stand-off position angular orientation and radial orientation relative to an imaging device. In other localized interest area image capture systems which do not require a docking apparatus then a user is required typically either to manually position an indicia bearing substrate in a certain axial stand-off position, angular orientation, and radial orientation relative to an imaging device or to position an imaging device in a certain axial stand-off position, angular orientation, and radial orientation relative to an indicia bearing substrate.

There is a need for an interest area image capture system which is easy to use, and does not require precise relative positioning between an indicia bearing substrate and an imaging device for operation.

SUMMARY OF THE INVENTION

According to its major aspects and broadly stated the invention is an image parsing system for execution by an imaging device in which a certain interest area of an electronically captured image, typically an area of an image comprising a signature, is parsed and either stored or transmitted for further processing.

The system includes an image reading instruction indicia positioned in a field of view of an imaging device and an imaging device specifically adapted for use in the system. The image reading instruction indicia may take on a variety of forms.

In accordance with a first type of image reading instruction indicia, the image reading instruction indicia comprises an parsing mode commencement indicator and at least one operation parameter indicator which determines an aspect of operation of an imaging device of the system which reads the image reading instruction indicia. When reading an image reading instruction indicia of the first type, an imaging device in accordance with the invention commences operation in an image parsing mode in which an aspect of the imaging parsing process is controlled by an operation parameter encoded in the image reading instruction indicia.

In a second type of image reading instruction indicia, the image reading instruction indicia comprises a parsing mode commencement indicator, and an identifier indicator. An image reading instruction indicia of the second embodiment is conveniently provided by an indicia other than a bar code symbol. When reading an image reading instruction indicia of the second type, the imaging device may parse and transmit image data of a scene comprising an image reading instruction indicia in a manner that depends on an identifier of the symbol.

In a third type of image reading instruction indicia, the image reading instruction indicia comprises an image parsing mode commencement indicator, but does not comprise either an operation parameter indicator or an identifier. When reading an image reading instruction indicia of the third embodiment, the imaging device operated in accordance with an image parsing program stored in a memory of or in communication with the imaging device. Variations of image parsing routings may be selected by the user.

In a fourth type of image reading instruction indicia, the image reading instruction indicia does not comprise any of a parsing mode commencement indicators, operation parameter indicator, or an identifier indicator. When reading an image reading instruction indicia of a fourth type an imaging device of the invention does not immediately commence operation in an image parsing mode. However, when the imaging device is later caused by a receipt of a user initiated command to operate in an image parsing mode, in image parsing routine is executed in a manner that depends on at least one feature of the image reading instruction indicia of the fourth type.

Preferably, whether the image reading instruction indicia is of the first, second, third, or fourth types, the imaging device of the invention, when executing an image parsing routine processed image data of a parsed section in accordance with at least one determined "imaging characteristic" of the image reading instruction indicia. The at least one imaging characteristic which may be determined from the image reading instruction indicia include an orientation characteristic, a scaling characteristic, and a distortion characteristic of the indicia.

The image reading instruction indicia of the invention may comprise, for example a bar code, a signature box, a string of text characters, a line, or a combination of the above types of markings.

These and other details, advantages and benefits of the present invention will become apparent from the detailed description of the preferred embodiment hereinbelow.

BRIEF DESCRIPTION OF THE DRAWINGS

The preferred embodiment of the invention will now be described, by way of example only, with reference to the accompanying Figures wherein like members bear like reference numerals and wherein:

FIG. 3g is a flow diagram illustrating operation of a main program in accordance with the invention configured to commence image data reading in an interest region in relation to an image reading instruction indicia after reading the image reading instruction indicia;

FIG. 7 illustrates an indicia identifier-parameter LUT according to the invention;

FIGS. 9a–9j illustrate various implementations of the invention.

DETAILED DESCRIPTION OF THE INVENTION

Figure 1:
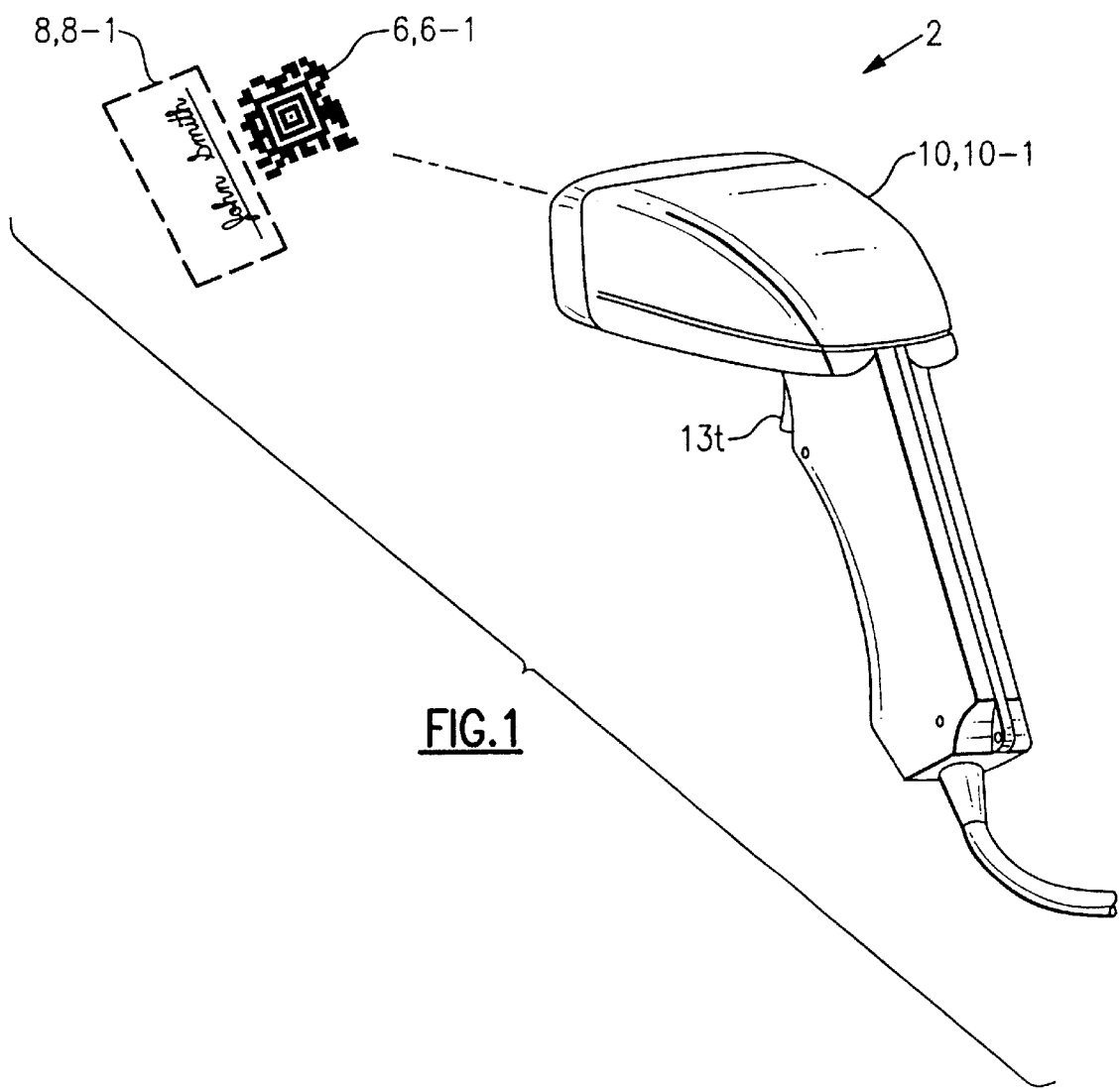
FIG. 1 is a schematic diagram of the system of the invention including an image reading symbol and a complementarily configured optical device.

A schematic diagram of the system of the invention is shown in FIG. 1. Image data reading system 2 includes an imaging device 10 such as a bar code device and a specially configured symbol, or indicia which shall be referred to herein as an image reading instruction indicia 6. Imaging device 10 and image reading instruction indicia 6 are complementarily configured so that device 10 develops image data representing an interest area 8 in a manner that depends on features of an image reading instruction indicia 6. Image reading instruction indicia 6 may take on a variety of forms.

In a first type of image reading instruction indicia, the image reading instruction indicia includes a parsing mode commencement indicator, and at least one operative parameter indicator. The at least one operation parameter indicator may be, for example, an indicator decodable to generate an image reading parameter for controlling an aspect of the image data reading process such as the dimension or position of an image data reading region. Additional operating parameter indicators may be provided to control aspects of the image capture process unrelated to the size and location of the image capture region. For example, image data reading parameter indicators may be provided to control such aspects of the image capture process as pixel resolution, gray scale depth, and color. The image reading instruction indicia may also include an output control parameter indicator for controlling an aspect of outputting image data. For example, an output control parameter may control the destination of outputted image data (i.e to a display device or a memory space), a data format of outputted image data, features of a displayed image such as orientation and/or size, compression algorithms utilized, and video preprocessing processes (gamma correction, contrast enhancement, edge peaking, etc.). An output control parameter may also control an aspect of image data processing subsequent to decoding. For example, an output control parameter may control an aspect of an OCR (optical character recognition) algorithm.

A plurality of image reading and/or image data reading indicator structures incorporated into an image reading instruction indicia may be substituted for by a single identification indicator structure identifying an identity of the image reading instruction indicia. In a second type of image reading instruction indicia, the image reading instruction indicia 6 includes an image parsing mode commencement indicator and an identifier. A memory space of a device configured to read such an image reading instruction indicia may have incorporated therein a lookup table including various image data reading and output parameters, which are caused to be read from a memory space when the device reads and decodes an image reading instruction indicia including an identifier indicator.

In a third type of image reading instruction indicia, the image reading instruction indicia 6 comprises an image parsing mode commencement indicator, but does not comprise either an operation parameter indicator or an identifier. When reading an image reading instruction indicia of the third type, an imaging device configured in accordance with the invention operates in accordance with an image parsing program stored in a memory of or in communication with the imaging device.

In a fourth type of image reading instruction indicia, the image reading instruction indicia 6 does not comprise any of a parsing mode commencement indicator, operation parameter indicator or identifier indicator. Reading an image reading instruction indicia of the fourth type does not result in device 10 immediately commencing operation in an image parsing mode. However, when an imaging device that has captured an image including a representation of an image reading instruction indicia of the fourth type is caused by a receipt of a user initiated command to operate in an image parsing mode, an image parsing routine is executed in a manner that depends on at least one feature of the image reading instruction indicia of the fourth type. In further aspects of the image reading instruction indicia, the image reading instruction indicia may be of a type adapted so that a device reading the indicia can determine imaging characteristics relating to the image reading instruction indicia, such as the scaling of the indicia, an orientation of the indicia; and/or a distortion of the indicia.

Figure 2A:
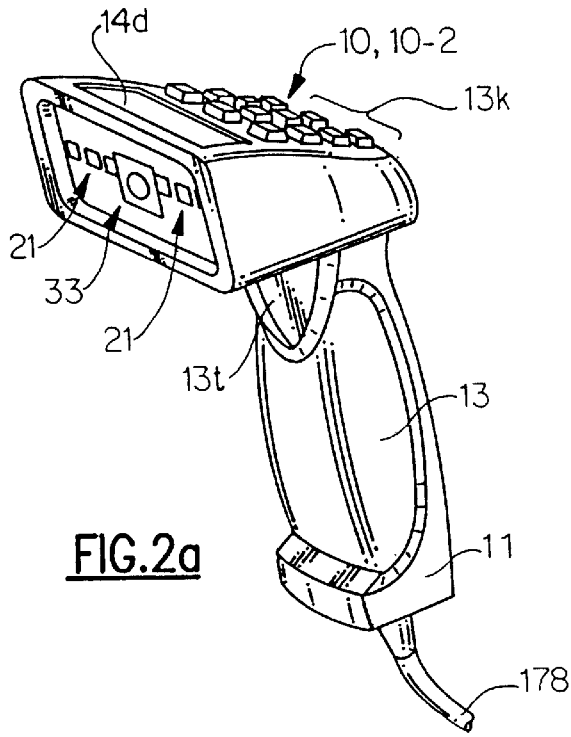
FIGS. 2a–2e illustrate types of imaging devices which may be implemented in the system of the present invention.
Figure 2B:
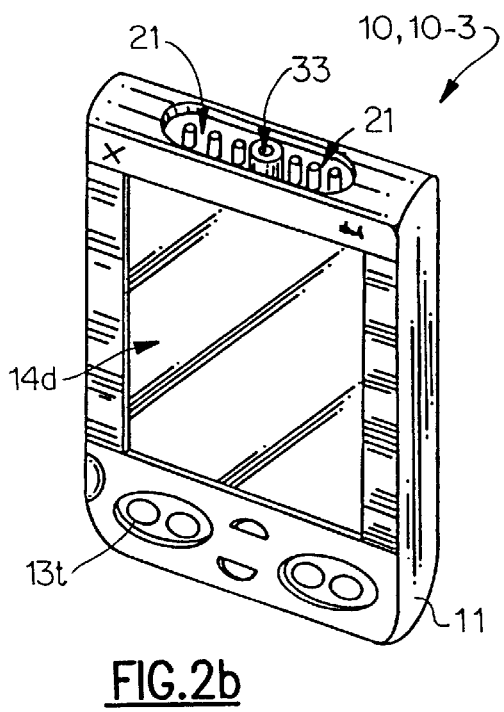
Figure 2C:
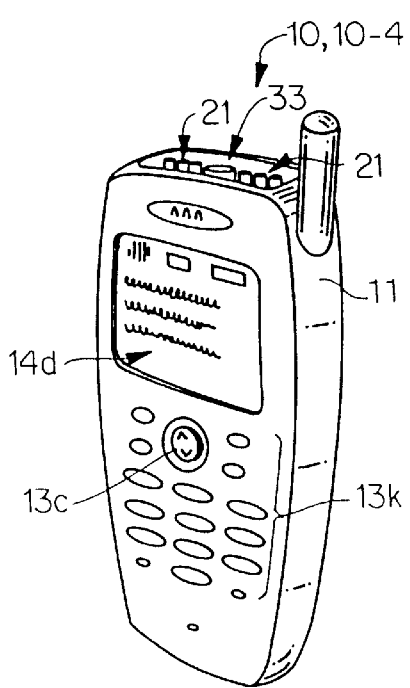
Figure 2D:
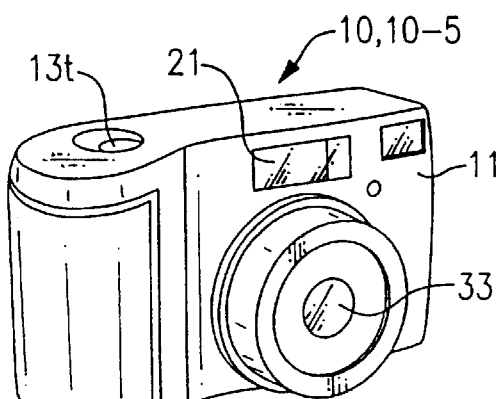
Figure 2E:
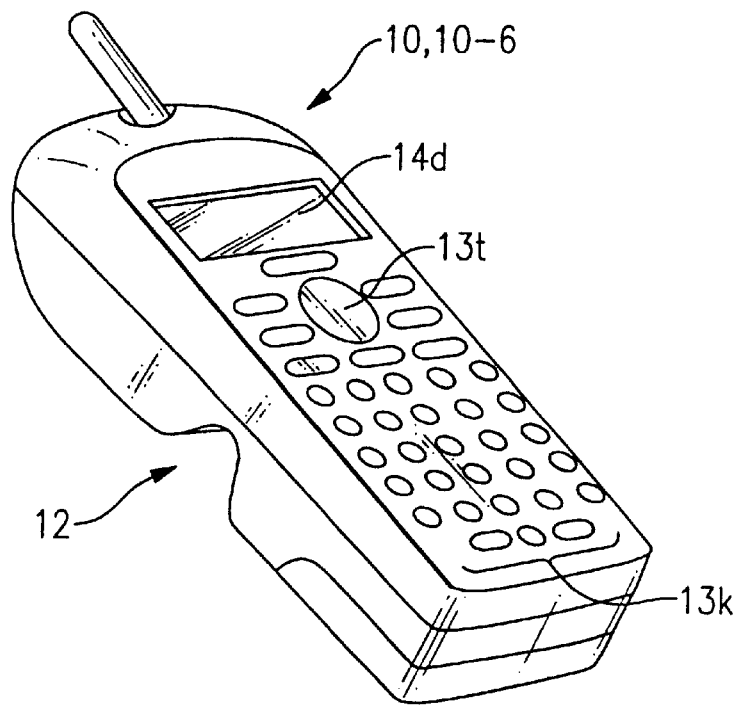

Shown in the embodiment of FIG. 1 as being provided by a keyboardless optical imaging device, imaging device 10 may take on a variety of forms. For example, the invention can be incorporated in a "gun" styled optical imaging device 10, 10-2 having a handle 13 and keyboard 13k, as indicated in the embodiment of FIG. 2a, or a palm-held personal computer, or personal data assistant (PDA) 10, 10-3 indicated in the example of FIG. 2b. The invention can also be incorporated in a wireless portable telephone 10, 10-4 as indicated by the example of FIG. 2c or in a digital camera 10, 10-5 as indicated by FIG. 2d. The invention can also be incorporated in a keyboard-equipped optical imaging device having the form having a finger saddle 12 shown in FIG. 2e, which is a imaging device sold under the trade name DOLPHIN by Hand Held Products, Inc. of Skaneateles Falls, N.Y. All of the above imaging devices 10-1, 10-2, 10-3, 10-4, 10-5, and 10-6 have incorporated therein an imaging apparatus 33 which includes at least imaging optics, and an image sensing device. The above imaging devices also include an illumination assembly 21 for illuminating a target area, T. In the embodiments of FIGS. 1–2c illumination assembly 21 typically comprises LEDs. Illumination assembly 21 of the digital camera 10-4 of FIG. 2d typically comprises a flash illuminator. All of the above imaging devices 10-1, 10-2, 10-3, 10-4, 10-5, and 10-6 also comprise a hand-held portable housing 11.

Shown as being provided by a hand held portable device, it will be understood that the invention can be incorporated in a presentation imaging device wherein display 14d serves to guide a user in moving a target indicia TI in a proper position relative to imaging device 10 rather than serving to guide a user in positioning imaging device 10 in a proper position relative to TI.

Block diagrams illustrating various types of electronic hardware configurations for optical imaging devices in which the invention may be incorporated and communication systems comprising at least one optical imaging device described with reference optical reader device 10a includes a imaging device processor assembly 30.

Imaging device processor assembly 30, includes an illumination assembly 21 for illuminating a target area T, such as a substrate bearing a 1D or 2D bar code symbol or a text string, and an imaging assembly 33 for receiving an image of object T and generating an electrical output signal indicative of the data optically encoded therein. Illumination assembly 21 may, for example, include an illumination source assembly 22, together with an illuminating optics assembly 24, such as one or more lenses, diffusers, wedges, reflectors or a combination of such elements, for directing light from light source 22 in the direction of a target object T. Illumination assembly 21 may comprise, for example, laser or light emitting diodes (LEDs) such as white LEDs or red LEDs. Illumination assembly 21 may include target illumination optics 2IT for projecting an aiming pattern 27 on target T. Illumination assembly 21 may be eliminated if ambient light levels are certain to be high enough to allow high quality images of object T to be taken. Illumination assembly 21 may also be located remote from imaging device housing 11, at a location so as to eliminate or reduce specular reflections. Imaging assembly 33 may include an image sensor 32, such as a color or monochrome 1D or 2D CCD, CMOS, NMOS, PMOS, CID or CMD solid state image sensor, together with an imaging optics assembly 34 for receiving and focusing an image of object T onto image sensor 32. Features and advantages associated with incorporating a color image sensor in an imaging device are discussed in greater detail in U.S. Ser. No. 09/904,697, filed Jul. 13, 2001, entitled "An Optical Reader Having a Color Imager" incorporated herein by reference. The array-based imaging assembly shown in FIG. 3a may be replaced by a laser array based imaging assembly comprising one or more laser sources, a scanning mechanism, emit and receive optics, at least one photodetector and accompanying signal processing circuitry.

Figure 3F:
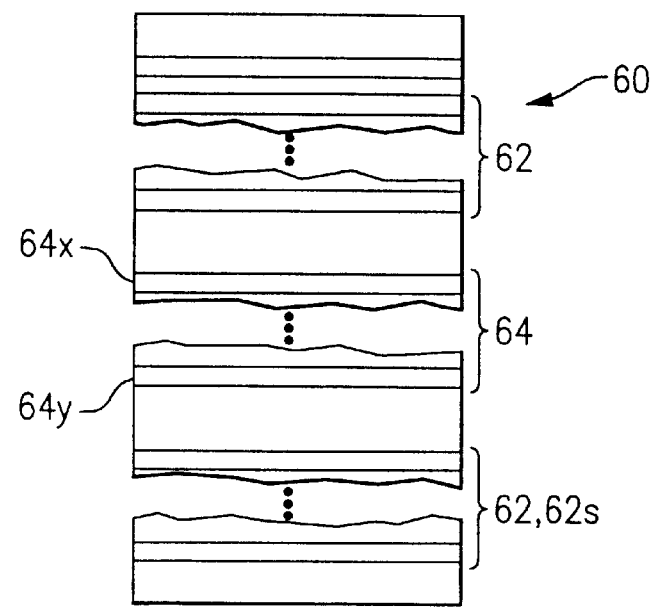
FIG. 3f is a memory map for purposes of illustrating a feature of the invention.
Figure 3A:
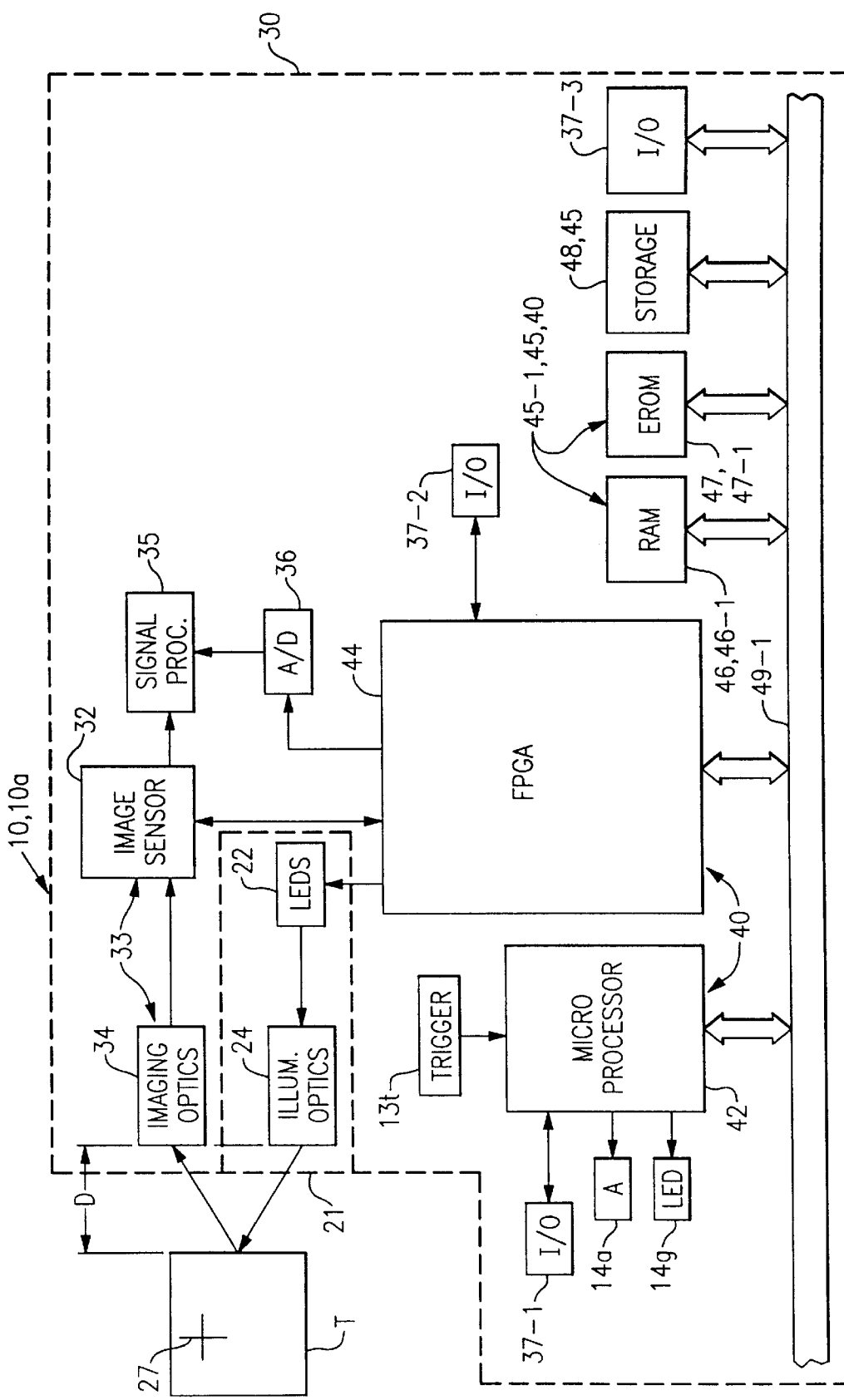
FIGS. 3a–3e are block diagrams illustrating hardware architectures of devices in which the invention may be incorporated.

Imaging device processor assembly 30 of the embodiment of FIG. 3a also includes programmable control circuit 40 which preferably comprises an integrated circuit microprocessor 42 and field programmable gate array (FPGA 44). The function of FPGA 44 could also be provided by application specific integrated circuit (ASIC).

Processor 42 and FPGA 44 are both programmable control devices which are able to receive, output and process data in accordance with a stored program stored in memory unit 45 which may comprise such memory elements as a volatile or non-volatile read/write random access memory or RAM 46, 46-1 and an erasable read only memory or EROM 47, 47-1. Memory 45 may also include one or more long term non-volatile memory storage devices (48, 45). For example, storage device 48, 45 may include e.g. a hard drive, or floppy disk to which data can be written to or read from. Storage device 48, 45 can be of a type that is securely installed in housing 11 (e.g. a hard drive) or can be of a type that can be removed from housing 11 and transported (e.g. floppy disk). Memory 45 can include what is referred to as a "flash" memory device. Several standardized formats are available for such flash memory devices including: "Multimedia" (MMC), "Smart Media," "Compact Flash," and "Memory Stick." Although the transfers of data between processor 40 and a flash memory device normally involve "blocks" of data and not "bytes" of data as in standardly known non-volatile RAM device, the operation of a "flash" memory device is similar to a standardly known non-volatile RAM memory device. Accordingly, a flash memory device can be considered to be represented by the one or more RAM blocks 46 of FIGS. 3a–3e. As is well known, flash memory devices are commonly available in a form that allows them to be removed from a first device and transported to a second device, e.g. between device 10 and device 68. Flash memory devices are particularly well suited for storing image data.

Processor 42 and FPGA 44 are also both connected to a common bus 49-1 through which program data and working data, including address data, may be received and transmitted in either direction to any circuitry that is also connected thereto. Processor 42 and FPGA 44 differ from one another, however, in how they are made and how they are used.

More particularly, processor 42 is preferably a general purpose, off-the-shelf VLSI integrated circuit microprocessor which has overall control of the circuitry of FIG. 2a, but which devotes most of its time to decoding decodable image data such as symbology or text character data stored in RAM 46, 46-1 in accordance with program data stored in EROM 47, 47-1. FPGA 44, on the other hand, is preferably a special purpose VLSI integrated circuit, such as a programmable logic or gate array, which is programmed to devote its time to functions other than decoding image data, and thereby relieve processor 42 from the burden of performing these functions.

The actual division of labor between processor 42 and FPGA 44 will naturally depend on the type of off-the-shelf microprocessors that are available, the type of image sensor which is used, the rate at which image data is output by imaging assembly 33, etc. There is nothing in principle, however, that requires that any particular division of labor be made between processors 42 and 44, or even that such a division be made at all.

With processor architectures of the type shown in FIG. 3a, a typical division of labor between processor 42 and FPGA 44 will be as follows. Processor 42 is preferably devoted primarily to such tasks as decoding image data in response to trigger 13t being activated, once such data has been stored in RAM 46, 46-1, controlling the outputting of user perceptible data via aural output 14A, good read indicator 14g and display 14d and, recognizing characters represented in stored image data according to an optical character recognition (OCR) scheme in response to an actuation of trigger 13t.

FPGA 44 is preferably devoted primarily to controlling the image acquisition process, the A/D conversion process and the storage of image data, including the ability to access memories 46-1 and 47-1 via a DMA channel. FPGA 44 may also perform many timing and communication operations. FPGA 44 may, for example, control the illumination of LEDs 22, the timing of image sensor 32 and an analog-to-digital (A/D) converter 36-1, the transmission and reception of data to and from a processor system external to assembly 30, through an RS-232, a network such as an ethernet, a serial bus such as USB, a wireless communication link (or other) compatible I/O interface as is indicated by interface 37-2. FPGA 44 may also control the outputting of user perceptible data via an output device, such as aural output device 14a, a good read LED 14g and/or a display monitor which may be provided by a liquid crystal display such as display 14d. Control of output, display and I/O functions may also be shared between processors 42 and 44, as suggested by bus driver I/O interface 37-3 or duplicated, as suggested by microprocessor serial I/O interface 37-1 and interface 37-2. As explained earlier, the specifics of this division of labor is of no significance to the present invention. The imaging device described with reference to FIG. 3a can be adapted for use in connection with the invention by providing a display, e.g. display 68d that is external to hand-held housing 11, but is in communication with control circuit 40.

Figure 3B:
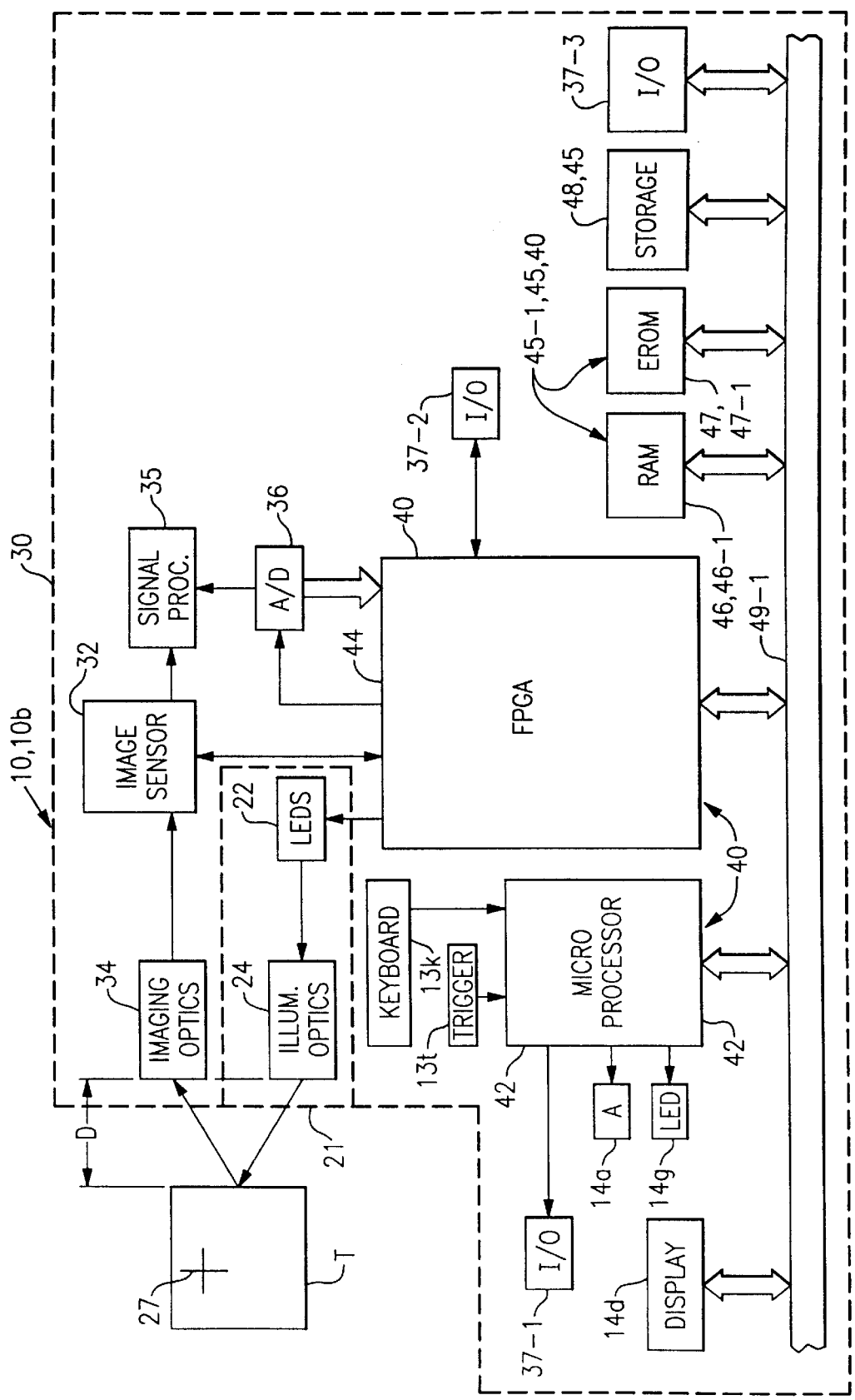

FIG. 3b shows a block diagram exemplary of an optical imaging device which is adapted to easily receive user-input control instructions resulting in a change in an operating program of a imaging device. In addition to having the elements of single state imaging device circuit of FIG. 3a, imaging device 10b includes a keyboard 13k for inputting data including instructional data and a display 14d for displaying text and/or graphical information to an operator. Keyboard 13k may be connected to bus 48-1, FPGA 44 or to processor 42 as indicated in FIG. 2b. Display 14d may be connected to FPGA 44, to processor 42 or to system bus 48-1 as is indicated in the particular embodiment of FIG. 3b.

An operator operating optical imaging device 10b can reprogram imaging device 10b in a variety of different ways. In one method for reprogramming imaging device 10b, an operator actuates a control button of keyboard 13k which has been pre-configured to result in the reprogramming of imaging device 10b. In another method for reprogramming imaging device 10b an operator actuates control of a processor system not integral with imaging device 10b to transmit an instruction to reprogram imaging device 10b. According to another method for reprogramming imaging device 10b, an operator moves imaging device 10b so that a "menu symbol" is in the field of view of image sensor 32 and then activates trigger 13t of imaging device 10b to capture an image representation of the menu symbol. A menu symbol is a specially designed bar code symbol which, when read by an appropriately configured optical imaging device results in a imaging device being programmed. The reprogramming of an optical imaging device with use of a menu symbol is described in detail in commonly assigned U.S. Pat. No. 5,965,863 incorporated herein by reference. Because the second and third of the above methodologies do not require actuation of a imaging device control button of keyboard 13k but nevertheless result in a imaging device being reprogrammed, it is seen that imaging device 10 may be keyboardless but nevertheless reprogrammable. It will be seen that the second or third of the above methodologies can be adapted for selecting operating modes described herein.

A typical software architecture for an application operating program typically executed by an optical imaging device as shown in FIG. 3b is shown in FIG. 3f depicting a memory map of a program stored in program memory 47-1. Application operating program 60 adapts a imaging device for a particular application. Three major applications or functions for an optical imaging device imaging device having image capture capability are: (1) comprehensive decoding; (2) data transfer; and (3) signature capture. In a comprehensive decoding application, imaging device 10 may preliminarily analyze and then decode a message corresponding to a bar code symbol or OCR decodable text character. In a data transfer application, imaging device 10 uploads character text files or image files to a processor system located externally relative to imaging device housing 11. In a signature capture application, imaging device 10 may capture an image corresponding to a scene having a signature, parse out from the image data that image data corresponding to a signature, and transmit the captured signature data to another processing system. It is seen that the third of such applications can be carried out by an optical imaging device imaging device that is not an optical imaging device decoder equipped with decoding capability. Numerous other application operating programs are, of course possible, including a specialized 1D decoding application, a specialized 2D bar code decoding algorithm, a specialized OCR decoding application which operates to decode OCR decodable text characters, but not bar code symbols. A user of a imaging device configured in accordance with the invention accesses a mode selector menu driver as exemplified by the embodiment of shown in FIG. 1a when a decoding function of the imaging device is actuated.

Referring now to specific aspects of the software architecture of an operating program 60, program 60 includes an instruction section 62, and a parameter section 64. Further, instruction section 62 may include selectable routine section 62s. Instructions of instruction section 62 control the overall flow of operations of imaging device 10. Some instructions of instruction section 62 reference a parameter from a parameter table of parameter section 64. An instruction of instruction section 62 may state in pseudocode, for example, "set illumination to level determined by [value in parameter row x]." When executing such an instruction of instruction section 62, control circuit 40 may read the value of parameter row 64x. An instruction of instruction section 62 may also cause to be executed a selectable routine, that is selected depending on the status of a parameter value of parameter section 64. For example, if the application program is a bar code decoding algorithm then an instruction of instruction section 62 may state in pseudocode, for example, "launch Maxicode decoding if Maxicode parameter of parameter row 64y is set to "on". When executing such an instruction, control circuit 40 polls the contents of row 64y of parameter section 64 to determine whether to execute the routine called for by the instruction. If the parameter value indicates that the selectable routine is activated, control circuit 40, executes the appropriate instructions of routine instruction section 62s to execute the instruction routine.

It is seen, therefore, that the above described software architecture facilitates simplified reprogramming of imaging device 10. Imaging device 10 can be reprogrammed simply by changing a parameter of parameter section 64 of program 60, without changing the subroutine instruction section 62s or any other code of the instruction section 62 simply by changing a parameter of parameter section 64. The parameter of a parameter value of section 62 can be changed by appropriate user control entered via keyboard 13k, by reading a menu symbol configured to result in a change in parameter section 64, or by downloading a new parameter value or table via a processor system other than system 40 as shown in FIGS. 3a and 3b. The reprogramming of imaging device 10b can of course also be accomplished by downloading an entire operating program including sections 62 and 64 from a processor system other than a system as shown in FIGS. 3a and 3b.

Figure 3C:
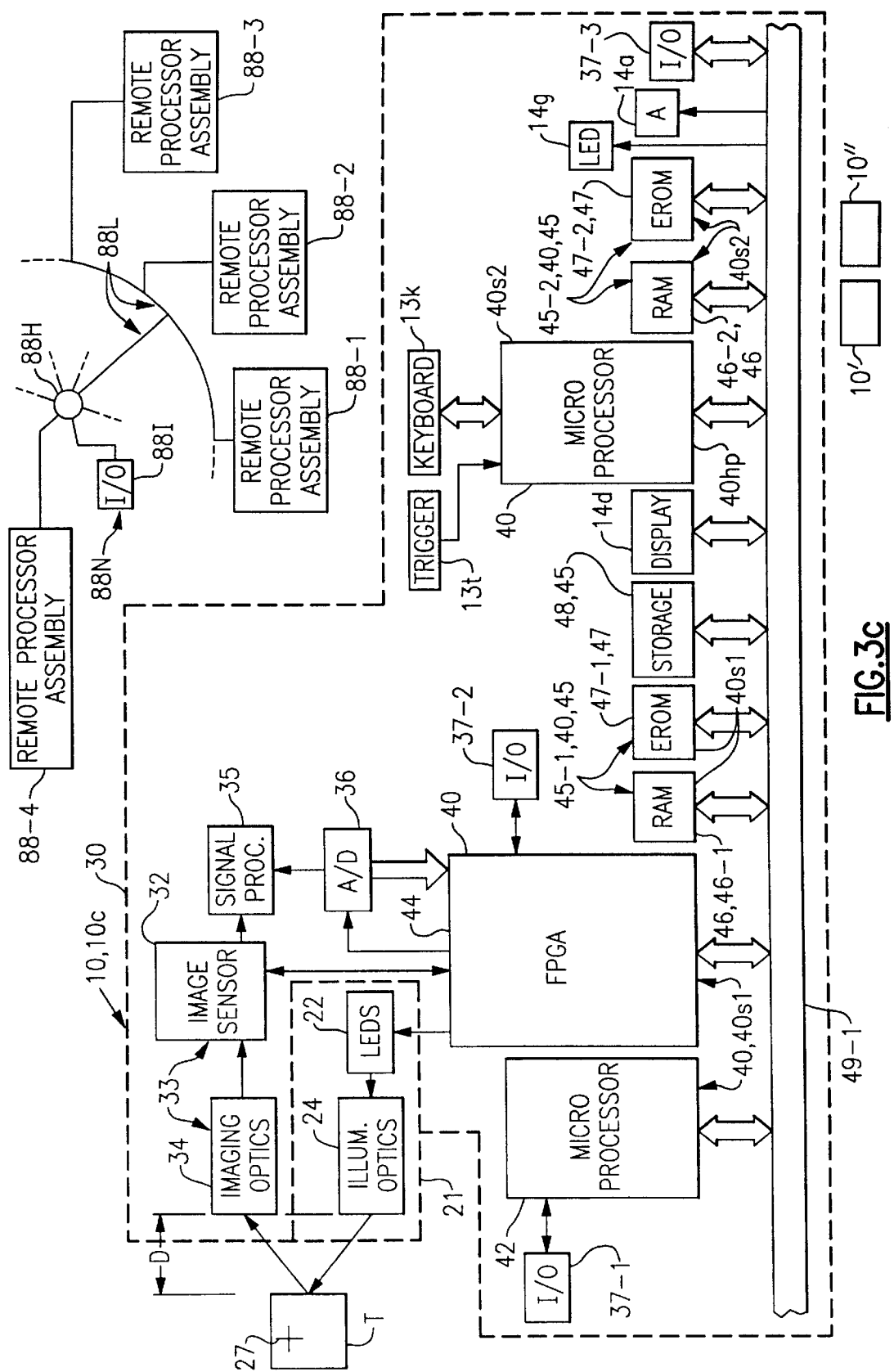

Another architecture typical of an optical imaging device which may be configured in accordance with the invention is shown in FIG. 3c. Imaging device 10c comprises a control circuit 40 having a processor system 40s1, and an integrated host processor system 40s2 which includes host processor 40hp and an associated memory 45-2. "Host processor system" herein shall refer to any processor system which stores a imaging device application operating program for transmission into a processor system controlling operation of a imaging device imaging system 33 or which exercises supervisory control over a processor system controlling operation of a imaging device imaging system 33, or which stores in its associated memory more than one application operating program that is immediately executable on reception of a command of a user. In a imaging device having two processors such as processor 42 and processor 40*hp*, processor 42 is typically dedicated to processing image data to decode decodable indicia, whereas processor 40*hp* is devoted to instructing processor 42 to execute decoding operations, receiving inputs from trigger 13*t* and keyboard 13*k*, coordinating display and other types of output by output devices 14*d*, 14*g*, and 14*a* and controlling transmissions of data between various processor systems.

In architectures shown in FIG. 3*c* having dedicated decoding processor system 40*s1* and a powerful, supervisory host processor system 40*s2*, host processor system 40*s2* commonly has stored thereon an operating system, such as DOS WINDOWS or WINDOWS, or an operating system specially tailored for portable devices such as, WINDOWS CE available from Microsoft, Inc. In the case that host processor system 40*s2* includes an operating system such as DOS or WINDOWS CE, the instruction section and parameter section of the operating program controlling the operation of host processor system 40*s2* normally are programmed in a high level programming language and assembled by an assembler before being stored in memory 47-2 and therefore may not reside in consecutive address locations as suggested by program 60 shown in FIG. 3*f*. Nevertheless, host processor system 40*s2* having an operating system integrated thereon can readily assemble an operating program into such a form for loading into an external processor system that does not have an operating system stored thereon.

Referring to further aspects of imaging devices 10*a*, 10*b*, and 10*c* at least one I/O interface e.g. interface 37-1, 37-2, and 37-3 facilitates local "wired" digital communication such as RS-232, ethernet, serial bus including Universal Serial Bus (USB), or local wireless communication technology including "Blue Tooth" communication technology. At least one I/O interface, e.g. interface 37-3, meanwhile, facilitates digital communication with remote processor assembly 88-1 in one of an available remote communication technologies including dial-up, ISDN, DSL, cellular or other RF, and cable. Remote processor assembly 88-1 may be part of a network 88N of processor systems as suggested by assemblies 88-2, 88-3, and 88-4 links 88L and hub 88H e.g. a personal computer or main frame computer connected to a network, or a computer that is in communication with imaging device 10*c* only and is not part of a network. The network 88N to which assembly 88-1 belongs may be part of the internet. Further, assembly 88-1 may be a server of the network and may incorporate web pages for viewing by the remaining processor assemblies of the network. In addition to being in communication with imaging device 10*c*, assembly 88-1 may be in communication with a plurality of additional imaging devices 10' and 10". Imaging device 10*c* may be part of a local area network (LAN). Imaging device 10 may communicate with system 88-1 via an I/O interface associated with system 88-1 or via an I/O interface 88I of network 88N such as a bridge or router. Further, a processor system external to processor system 40 such as processor system 70*s* may be included in the communication link between imaging device 10 and assembly 88-1. While the components of imaging devices 10*a*, 10*b*, and 10*c* are represented in FIGS. 3*a*–3*c* as discreet elements it is understood that integration technologies have made it possible to form numerous circuit components on a single integrated circuit chip. For example, with present fabrication technologies, it is common to form components such as components 42, 40, 46-1, 47-1, 37-2, and 37-1 on a single piece of silicone.

Furthermore, the number of processors of imaging device 10 is normally of no fundamental significance to the present invention. In fact if processor 42 is made fast enough and powerful enough special purpose FPGA processor 44 can be eliminated. Likewise, referring to imaging device 10*c*, a single fast and powerful processor can be provided to carry out all of the functions contemplated by processors 40*hp*, 42, and 44 as is indicated by the architecture of imaging device 10*e* of FIG. 3*c*. Still further, it is understood that if imaging device 10 includes multiple processors the processors may communicate via parallel data transfers rather than via the serial communication protocol indicated by serial buses 49-1 and 49-2. In addition, there is no requirement of a one-to-one correspondence between processors and memory. Processors 42 and 40*hp* shown in FIG. 3*c* could share the same memory, e.g. memory 45-1. A single memory e.g. memory 45-1 may service multiple processors e.g. processor 42 and processor 40*hp*.

Figure 3D:
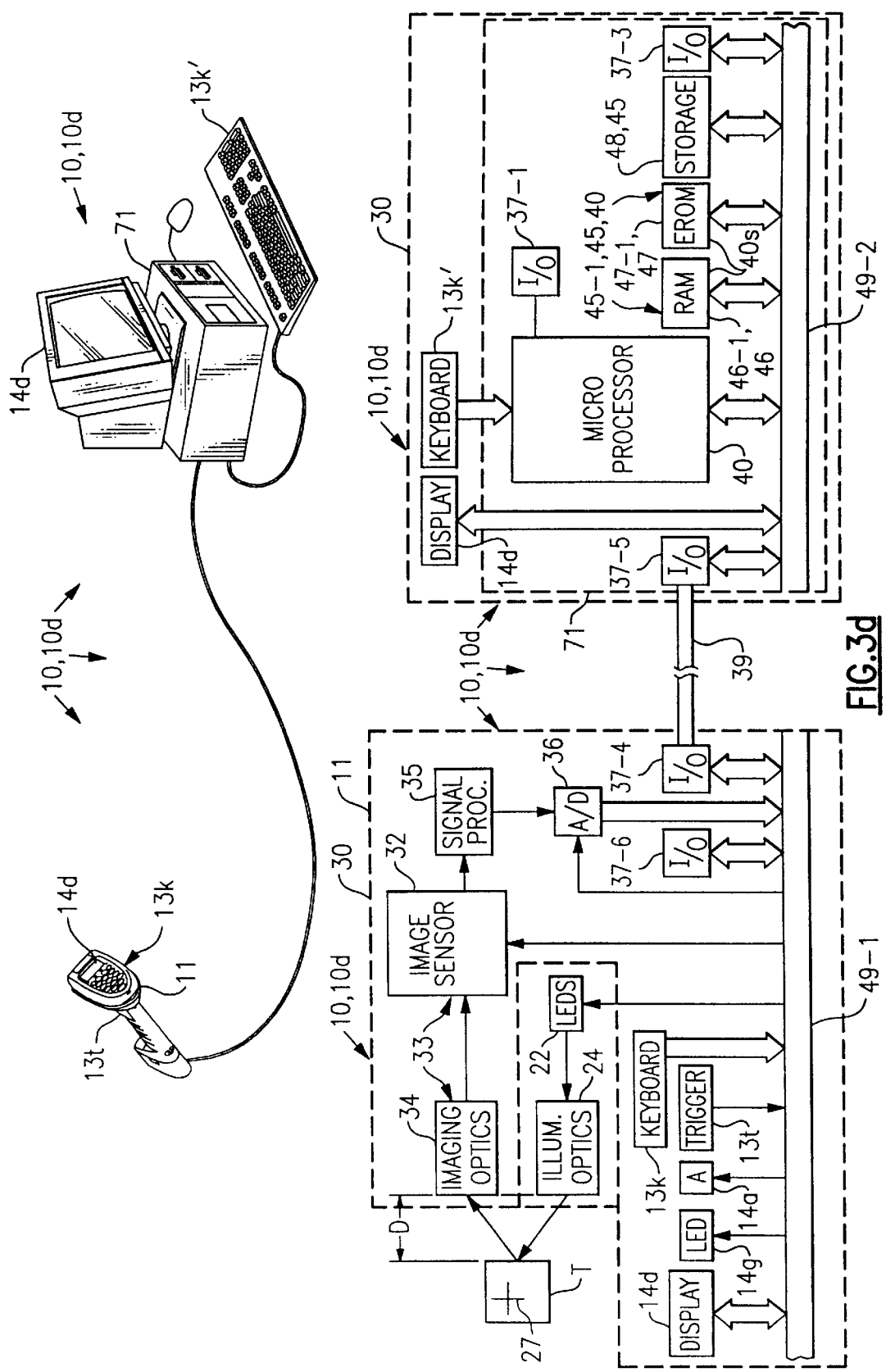

Referring to the embodiment of FIG. 3*d*, it is seen that it is not necessary that the entirety of electrical components of an optical imaging device 10 be incorporated in a portable device housing 11. The electrical components of imaging device 10*d* are spread out over more than one circuit board that are incorporated into separate device housings 11 and 71. It is understood that circuitry could be spread out into additional housings. Control circuit 40 in the embodiment of FIG. 3*d* is incorporated entirely in the housing 71 that is non-integral with portable device housing 11. Housing 71 is shown as being provided by a personal computer housing, but could also be provided by another type of housing such as a cash register housing, a transaction terminal housing or a housing of another portable device such as housing 11. At least one operating program for controlling imaging assembly 33 and for processing image signals generated from imaging assembly 33 is stored in EROM 47-1 located within PC housing 71. For facilitating processing of signals generated from imaging assembly 33 by a processor system that is not integrated into portable housing 11 a high speed data communication link should be established between imaging assembly 33 and processor system 40. In the embodiment of FIG. 3*d*, I/O interfaces 37-4 and 37-5 and communication link 39 may be configured to operate according to the USB data communication protocol. The configuration shown in FIG. 3*d* reduces the cost, weight, and size requirements of the portable components of imaging device 10*d*, which in imaging device 10-4 are the components housed within portable housing 11. Because the configuration of FIG. 3*d* results in fewer components being incorporated in the portable section 11 of imaging device 10*d* that are susceptible to damage, the configuration enhances the durability of the portable section of imaging device 10-4 delimited by housing 11.

The control circuit 40 as shown in the embodiment of FIG. 3*d* can be in communication with more than one "shell" processorless imaging device comprising a imaging device housing and a imaging device circuitry shown by the circuitry within dashed housing border 11 of FIG. 3*d*. In the case that a control circuit as shown in FIG. 3*d* services many "shell" imaging devices or processor-equipped imaging devices input/output port 37-5 should be equipped with multiplexing functionality to service the required data communications between several imaging devices and/or shell imaging devices and a single processor system.

Figure 3E:
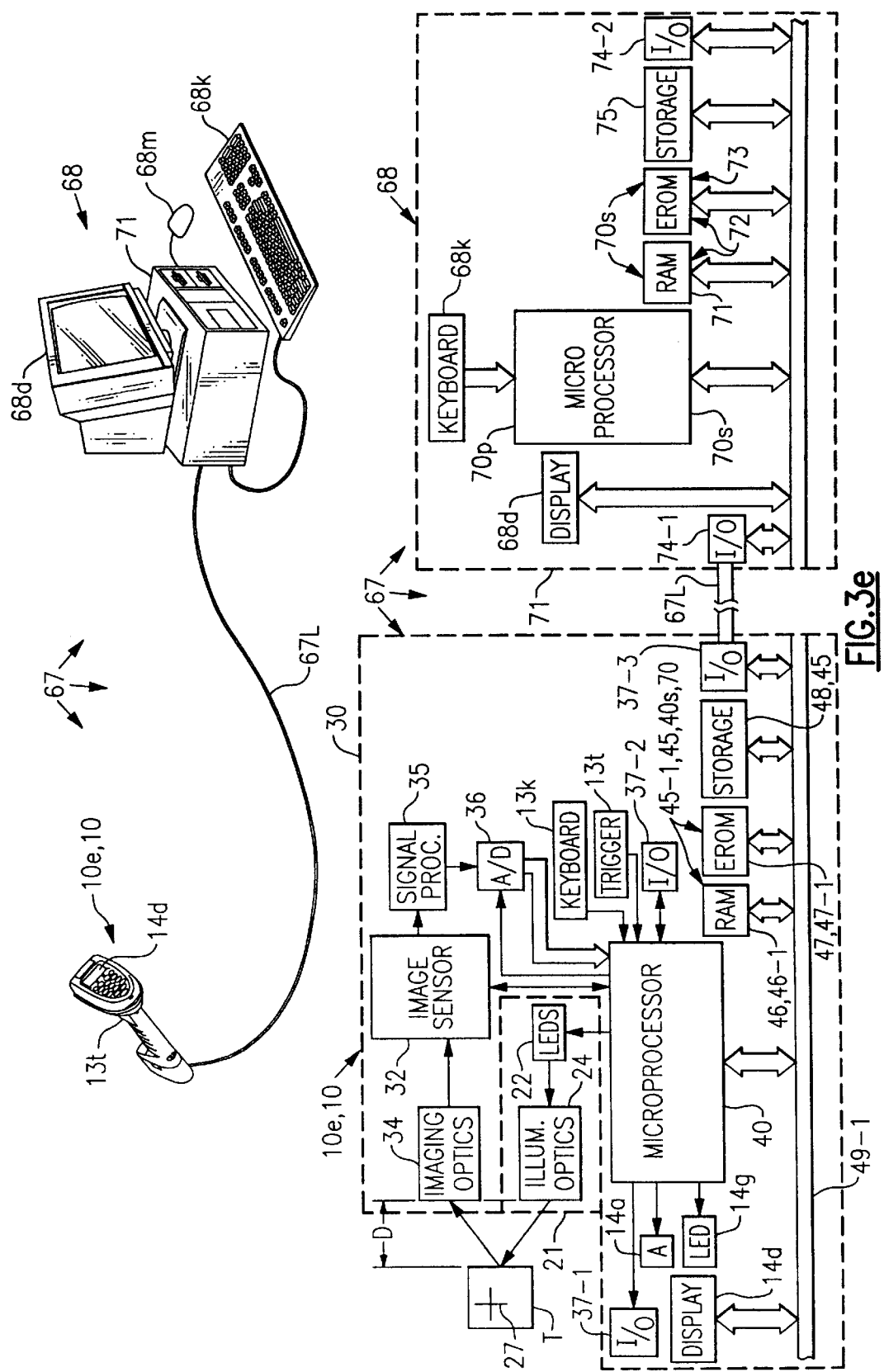

The imaging device communication system of FIG. 3e has a physical layout identical to imaging device 10d, but is optimized for a different operation. System 67 is a communication system in which imaging device processor system 40 communicates with a nonintegrated local host processor assembly 68 provided by a personal computer 68 having a PC housing 71, a processor system 70s, a storage device 75 (e.g hard drive or flash disk), a keyboard 68k, a mouse 68m, and a display 68d. Provided that link 67L is a high speed communication link, nonintegrated local host processor system 70s could be programmed to provide functioning identical to processor system 40s of imaging device 10d. However, because imaging device 10e comprises an integrated processor system 40 such programming is normally unnecessary, although as described in copending application Ser. No. 09/385,597, incorporated by reference herein it is useful to configure processor system 40 communication with a host processor system e.g. 70s so that certain components of imaging device 10 such as trigger 13t can be controlled remotely by host processor system 70s, which in one embodiment is nonintegrated. Accordingly, in imaging device-host communication systems as shown in FIG. 3e nonintegrated host processor assembly 68 typically is programmed to provide functions separate from those of the imaging device processor systems described in connection with FIGS. 3a–3d.

As described in U.S. Pat. No. 5,965,863, incorporated herein by reference, one function typically provided by nonintegrated local host processor system 70s is to create operating programs for downloading into imaging device 10. Processor system 70s typically has an operating system incorporated therein, such as WINDOWS, which enables an operator to develop operating programs using a graphical user interface, which may be operated with use of a pointer controller 68m. Nonintegrated local processor system 70s also can be configured to receive messages an/or image data from more than one imaging device, possibly in a keyboard wedge configuration as described in U.S. Pat. No. 6,161,760, incorporated herein by reference. It is also convenient to employ processor system 70 for data processing. For example a spreadsheet program can be incorporated in system 70s which is useful for analyzing data messages from imaging device 10e. An image processing application can be loaded into system 70s which is useful for editing, storing, or viewing electronic images received from imaging device 10e. It is also convenient to configure imaging device 10e to coordinate communication of data to and from a remote processor assembly such as assembly 88-1. Accordingly processor assembly 68 typically includes I/O interface 74-2 which facilitates remote communication with a remote processor assembly, e.g. assembly 88-1 as shown in FIG. 3c.

FIG. 3g shows a flow diagram illustrating operation of one type of imaging device configured in accordance with the invention. The specific example of FIG. 3g applies to the specific case where imaging device 10 is adapted for bar code decoding and image reading local processor system 70s also can be configured to receive messages an/or image data from more than one imaging device, possibly in a keyboard wedge configuration as described in U.S. Pat. No. 6,161,760, incorporated herein by reference. It is also convenient to employ processor system 70 for data processing. For example a spreadsheet program can be incorporated in system 70s which is useful for analyzing data messages from imaging device 10e. An image processing application can be loaded into system 70s which is useful for editing, storing, or viewing electronic images received from imaging device 10e. It is also convenient to configure imaging device 10e to coordinate communication of data to and from a remote processor assembly such as assembly 88-1. Accordingly processor assembly 68 typically includes I/O interface 74-2 which facilitates remote communication with a remote processor assembly, e.g. assembly 88-1 as shown in FIG. 3c.

FIG. 3g shows a flow diagram illustrating operation of one type of imaging device configured in accordance with the invention. The specific example of FIG. 3g applies to the specific case where imaging device 10 is adapted for bar code decoding and image reading instruction indicia 6 is provided by a standardly available bar code. Steps 105–120 and steps 145–170 apply generally to one type of standardly known imaging device in which steps of the invention may be implemented, while steps 121 through 125 are steps that apply specifically to the indicia-controlled image parsing system of the invention. The flow diagram of FIG. 3g illustrates a common implementation of the invention. In the example of FIG. 3g, it is illustrated that an image data parsing mode of operation may be commenced while imaging device 10 is operating in a standard bar code decoding mode of operation. By the example of FIG. 3g, it is illustrated that the normal course of a decoding messages encoded by bar codes can be interrupted by the reading of an image reading instruction indicia 6 of the first, second, or third types. As explained previously, image reading instruction indicia 6 of the first second and third types have parsing mode commencement indicators which when recognized by a complementarily programmed imaging device results in the imaging device operating in an image parsing mode. Thus, when recognizing a parsing mode commencement indicator during the course of decoding bar codes, imaging device 10 captures an image of a scene and parses an interest area from the image representation, as will be explained herein.

Figure 3H:
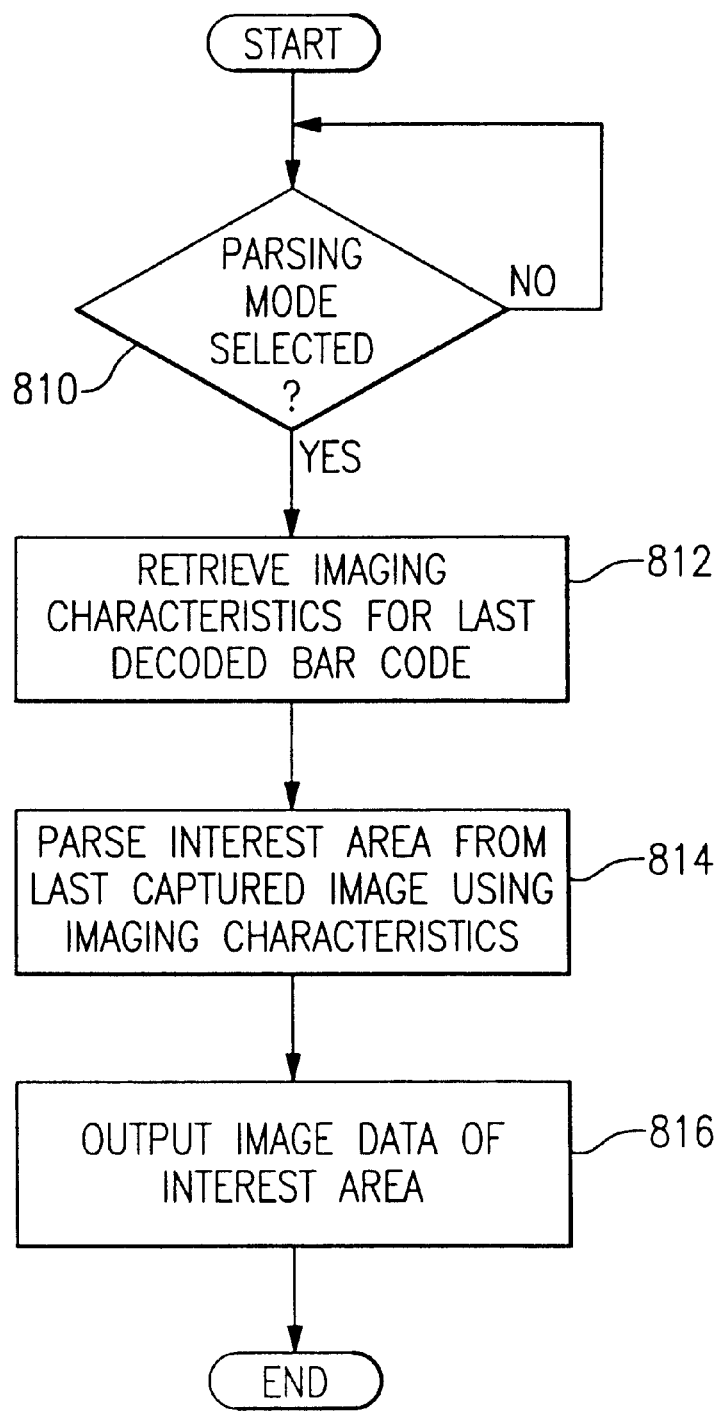
FIG. 3h is a flow diagram illustrating a user-initiated image parsing mode according to the invention.

It will be understood, however, that an image parsing mode in accordance with the invention can be commenced while imaging device 110 is operating in a mode other than a bar code decoding mode. Of course device can be operating, in for example, an OCR decoding mode, or a combined bar code and OCR decoding mode of operation. In addition, device 10 can be operating in a mode other than a bar code or OCR decoding mode when an image parsing mode is commenced. In one embodiment of the invention, that is explained more fully in connection with FIG. 3h device 10 is caused to execute an image parsing mode by receipt of a user input command which is typically input via keyboard 13k. Importantly, it will be understood that an image parsing mode of the invention can be executed using image representations other than recently captured image representations. An image parsing mode can be executed using an image representation stored in memory 45 that had been captured a substantial time prior to commencement of an image parsing mode. It should be understood that the operating program described with reference to FIG. 3g herein is provided only to show, by way of example, a type of bar code decoding operating program which may be modified in accordance with the invention and should not be taken as limiting of the varying types of decoding programs which may be modified in accordance with the invention.

Referring to the general operational steps of the decoding operation program indicated by the flow diagram of FIG. 3g, the bar code decoding operation program begins with block 105 which causes the device to wait in a low power state until a device trigger is pulled. When the trigger is pulled, control circuit 40 is directed to block 110 which causes it to power up and initialize the device hardware. Control circuit 40 is then directed to blocks 115 and 116 which cause it to define the image data memory space that will be used and to initialize the device with the default values of various operating parameters governing various aspects of the operation of the device.

Examples of such operating parameters may include, for example, the frame rate of the image sensor, the codes that will be enabled during decoding, the I/O communication protocols, beeper pitch or volume, among others. The default values of these parameters correspond to a combination of parameters which are suitable for use under most operating conditions. Additional operating parameters may control specialized functions if the device shown such as a multiple symbol decoding function (block 143) or a repeat until done function (block 147).

After the device has been initialized, in block 116, control circuit 40 proceeds to blocks 117 and 118, which call for control circuit 40 to capture and attempt to decode an image of a target bar code. The term "capturing" herein shall generally refer to the process wherein control circuit 40 stores an image map representation of a scene into memory 45. The term "reading" shall refer generally to transfers of data involving memory stored image data subsequent to an image map being stored into memory 45.

If a decoding is not successful (that is, if the control circuit is unable to determine the bar code type or information encoded in the message) then control circuit 40 is directed to block 117 and captures a next frame unless the imaging device has been previously programmed not to repeat image capture (block 142) or receives a command to cease capturing images (135, 140).

If control circuit 40 is successful in decoding the bar code (block 120), then the control circuit 40 will be able to determine if the bar code is an image reading instruction indicia in accordance with the invention. Block 122 illustrates an operation step in the program of the invention in the case that an image reading instruction indicia includes data reading indicators indicating the dimension of the image capture region, or "interest region" and the position in relation to the indicia of the image capture region.

If the control circuit 40 at block 121 determines that the indicia is an image reading instruction indicia and that, therefore, the imaging device is to commence an image parsing mode of application according to the invention then control circuit 40 proceeds to block 122 and reads image reading parameters from the indicia which in the case shown pertain to the dimension and relative position of the interest region of the image. In a simplified embodiment, such as may be the case if the image reading instruction indicia is provided in a 1D bar code then control circuit 40 at this point may be caused to parse image data from an image map based only on the dimension and relative position data read from the image reading instruction indicia. In one simplified embodiment of the invention, the dimension and relative position indicators read from the image reading instruction indicia correspond to pixel values. That is, dimension parameter indicators of the indicia may indicate the number of pixels of image data to read in the x and y dimensions of the pixel array, and the relative position indicator parameter may indicate a pixel distance between the center of an image reading parameter and the center of an image data reading region. In this simplified embodiment, an output image data step according to the invention (block 125) would comprise reading and outputting image data from an original image map representation of an image captured at block 125. However, such a simplified embodiment of the invention is normally significantly useful only in the case where an imaging device is positioned in a fixed position, orientation and distance form an image reading instruction indicia 6.

In a highly useful and versatile embodiment of the invention, the dimension and relative position indicators of the image reading instruction indicia indicate the actual dimension and relative distance, in distance units, of an image data reading region, and the device is configured to read interest region image data at a specific location in reference to an indicia 6 regardless the orientation of device 10 or indicia-to-device distance during reading.

Figure 4A:
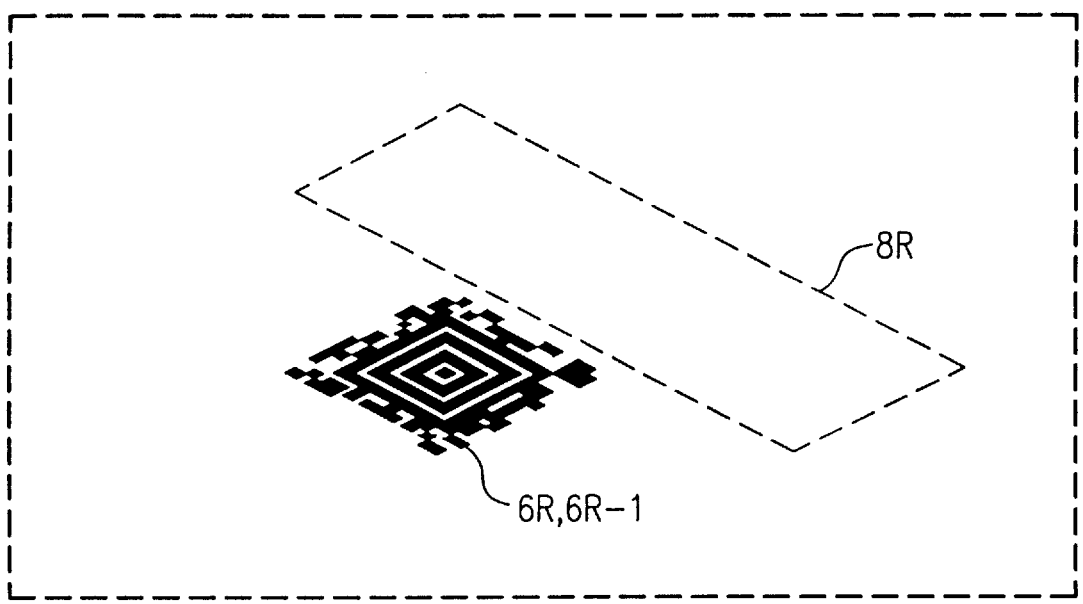
FIGS. 4a–4b and 4c show various image map representation graphs illustrating construction of a secondary bit map representation of an image data reading region.

FIG. 4*a* shows an image map corresponding to a scene including a captured image reading instruction indicia representation 6R captured with a device positioned at an unknown angle, and at an unknown distance with respect to an indicia. The indicia representation 6R in the example shown corresponds to the first type of image reading instruction indicia described and includes, along with a parsing mode commencement indicator, image reading operation parameter indicators indicating the dimension and relative position of an image data reading region, in actual distance units. After reading at block 122 the dimension and relative position indicators determined from the decoded symbol (decoded at block 118, the imaging device may determine from the image map image data, scaling characteristics, orientation characteristics, and distances characteristics for the captured image reading instruction symbol (block 123). A scaling factor for the captured indicia representation 6R can be determined, in general, by taking into account the number of modules captured, the type of bar code to determine the actual size of the modules which are normally of a standard size, and the number pixels representing the captured image. The indicia representation 6R may also include a data message corresponding to the actual size of the indicia. The orientation of the indicia representation 6R can be determined based on a method which may vary depending on the indicia type. In several styles of indicia, at least two indicia edges include distinguishing indicia so that the relative position of the edges and orientation of the symbol can be determined. In the Aztec bar code shown, corners of central bulls eye structure comprise specialized indicia (orientation patterns) for indicating the orientation of the symbol. Distortion characteristics of captured indicia 6R may be determined, for example, by taking account the relative position of corner points A, B, C, and D of the captured symbol. In many applications, data pertaining to the scale, orientation, and/or distortion characteristics of captured indicia 6R may be previously determined by controller 40 at block 118 when controller 40 attempts to decode the indicia. In the case that such data has been previously determined, it would of course be unnecessary to determine the data again from the bit map representation. Instead, if scaling, orientation or distortion data has been previously determined the required data at block 122 can be determined by reading the data from a memory space of device 10.

The substrate on which an indicia 6 may be formed may be provided by, for example, a sheet of paper, an object, or a body part. The scene region(s) desired to be captured and processed need not be located on the same substrate as indicia 6.

Figure 5:
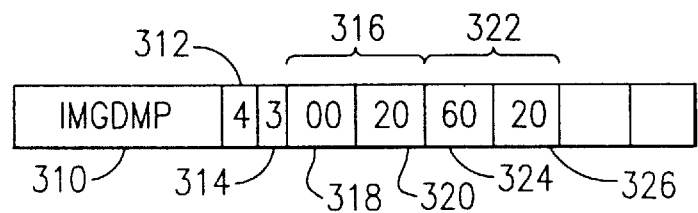
FIG. 5 illustrates a possible embodiment of a feature of the invention wherein image data reading parameters are provided in a decoded message of a menu symbol.

It will be recognized that it is useful to select image reading instruction indicia 6 have predetermined geometries allowing scaling, orientation, and distortion characteristics to be determined for virtually any symbology selected for use as an image reading instruction symbol. Features of the Aztec symbology shown the various specific examples of the invention discussed herein are described in detail in U.S. Pat. No. 5,591,956 issued to the assignee of the present invention, and incorporated by reference herein. Aztec 2D bar code symbols are well suited for use as image reading instruction indicia of system 2 because distortion and scaling characteristics for Aztec bar codes are readily determined, and, as will be described in connection with FIGS. 4*b* and 4*c*, a distortion "imaging" characteristic of Aztec symbol can readily be determined based on the rectangular finder pattern or bullseye of such symbols. In an Aztec bar code, data fields, or bytes are read in concentric rings about a center bullseye to generate a data message having the standardly known bar code data message form shown in the data message map of FIG. 5. FIG. 5 is provided to highlight advantages of using a standardly known bar code as an image reading instruction indicia 6 in a system 2 according to the invention. The dark to light markings of a bar code can be encoded to constitute indicators of an image reading indicia according to the invention, which are readily decoded by control circuit 40 into a form readily processable by control circuit 40.

As is indicated by the data message map of FIG. 5, a first data field 310 may include a character or characters which when read by device 10, result in the device commencing an image parsing mode of operation according with the invention. A second data field 312 may indicate an operating parameter image reading parameter such as pixel resolution of a constructed secondary image map representation of an image reading region. A third field 314 may indicate another image reading operating parameter such as image depth. For example, the number 0 encoded in field 314 may indicate a binary image depth, while the number 3 encoded in field 314 may indicate an 8 bit gray scale. Fourth and fifth data fields 316 may comprise operating parameters indicating the relative position of the center of the data reading region to the center of the image reading instruction symbol. For example, field 318 may indicate a signed distance in the x dimension between the center of the symbol and the center of the image reading region, while field 320 may indicate a signed distance in the y dimension between the center of the symbol and the center of the image reading region. Sixth and seventh fields 322 may indicate the dimension of the image data reading region. For example, field 324 may indicate a height of an image data reading region, while field 326 may indicate a width of an image data reading region. Further data fields may be provided to indicate additional image data reading parameters or image data output parameters.

When the scale and orientation of the captured image reading instruction indicia are determined, imaging device 10 may determine, at block 123 the boundaries of an image data reading or "interest" region of the captured image representation utilizing the dimension and relative position parameter of the image data region read from the indicia 6, and the scaling factor and orientation factors determined for the indicia as explained herein.

Figure 4B:
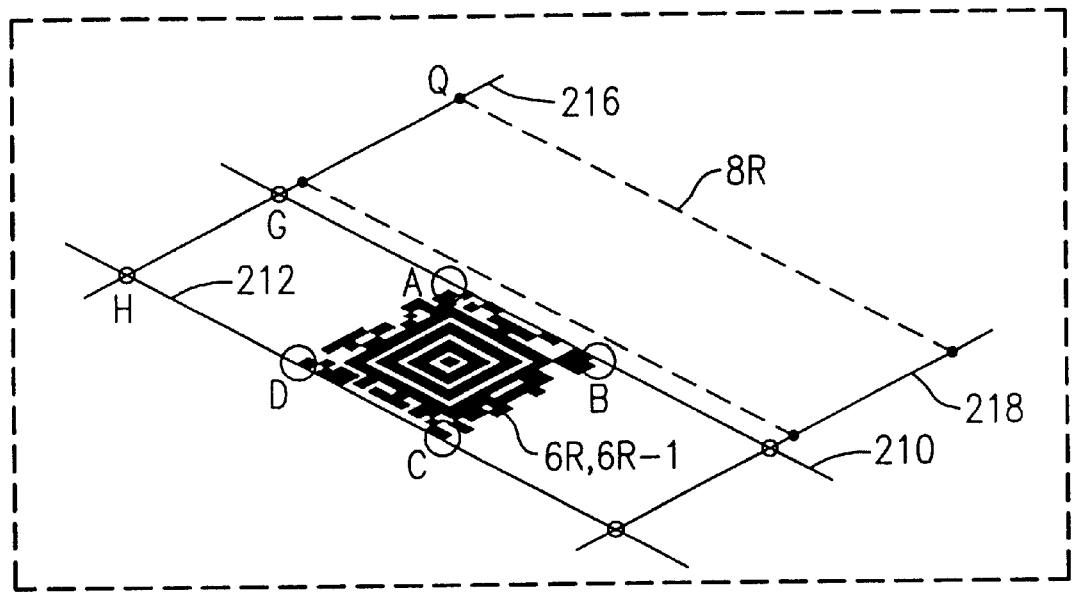
Figure 4C:
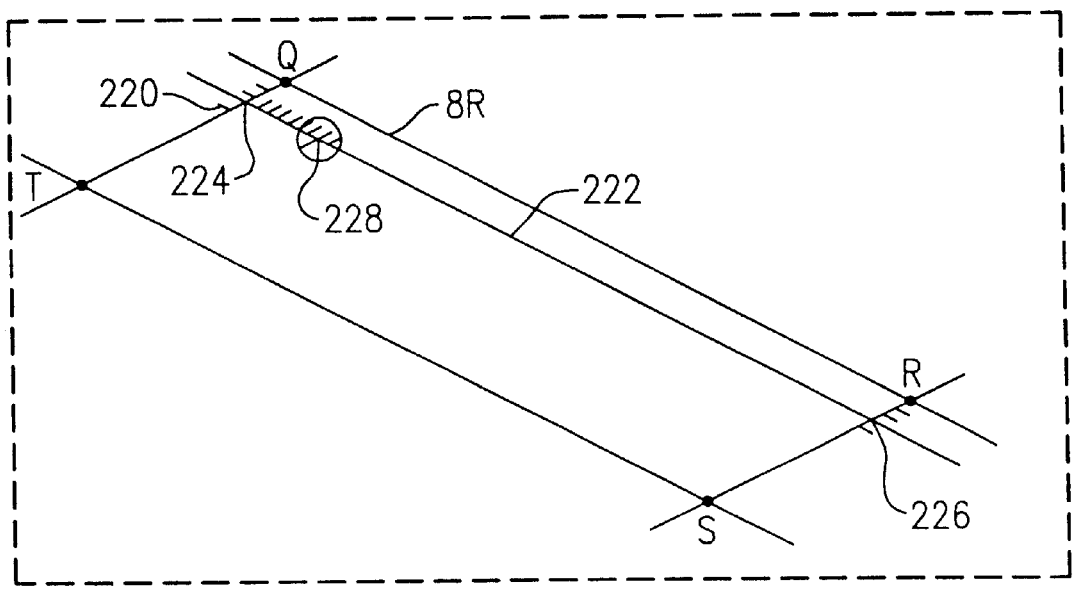

A method for developing image data of an interest region in the case that image distortion is corrected for is described with reference to the image map image representation of FIGS. 4*b* and 4*c*. FIGS. 4*b* and 4*c* illustrate an interpolated grid line distortion correction method in which a distortion characteristic of an indicia representation 6R is determined. The image data reading or interest region 8R determined in the example provided for the image map representation of FIGS. 4*b* and 4*c* is required by the image data reading parameters of captured indicia representation 6R to be above indicia representation 6R and of the same orientation as indicia representation 6R. However, it will be recognized that an interest region 8R may be of any orientation, size, or shape with respect to indicia representation 6R, and may include pixel values representing all or part of indicia representation 6R. In the example provided, interest region 8R is defined by a dimension parameter including a height parameter and a width parameter, and a relative position parameter indicating the position of the center of the image data reading or interest region 8R relative to the center of indicia representation 6R.

In order to calculate the pixel location of corner point Q defining a boundary of the data reading region, an infinite imaginary grid line 210 is established through top corner points A and B for the indicia representation 6R, and infinite imaginary grid line 212 is established between bottom corner point D and C for the symbol. Temporary points G and H are then determined along imaginary grid lines 210 and 212 respectively, based on the scale of the symbol, the width dimension of interest region 8R, and the relative position indicator of the image reading region, and infinite imaginary grid line 216 is established between the temporary points G and H a second grid line 218 can be established following the same method. First corner mark Q for the interest region 8R can then be established along imaginary grid line 216 based on the relative position indicator for the image reading region and the height dimension of the image reading region. Remaining boundary points R, S, T for the image reading region are determined utilizing the same method.

When boundary points Q, R, S, and T for interest region 8R are determined (block 123), a secondary image map representative of indicia in an interest area corresponding to region 8R is constructed (block 124). Construction of a secondary image map image representative of an interest area is described with reference specifically to FIG. 4*c*. The required resolution of the secondary image map image can be encoded in an image data reading parameter of the image reading instruction symbol, or else may be encoded in the operating program of the device. In constructing the secondary image map image, equally spaced points 220 in the number of the resolution in the y dimension are plotted along line Q–T, and along line R–S. Imaginary pixel locator lines such as grid line 222 are then interpolated between opposing points, for example, points 224 and 226). For determining pixel locator lines in the y dimension, equally spaced points in the number of the required resolution in the x dimension are plotted along lines Q–S, and lines T–S, and y dimension pixel locator grid lines are interpolated between opposing points on the Q–R and T–S lines. When the imaginary pixel locator grid lines are established, a grid is formed comprising a plurality of intersecting imaginary pixel locator lines. Each point of intersection 228 of the pixel locator lines corresponds to a pixel of the constructed secondary image map. The value of each individual pixel in the secondary bit map image is interpolated according to one of several well known methods utilizing the pixel values from the original bit map representation of the captured image bordering the location of the intersecting lines. It is seen that a secondary image map interest region representation of markings, e.g. signature markings, e.g. corresponding to an interest area can be constructed so that the secondary image map better represents the actual size and appearance of the markings, than would be provided by an interest region image representation generated without construction of a secondary image map.

In accordance with further aspects of the invention, imaging device 10 can be configured with a feedback function which provides an indicia to a user in the event control circuit at block 123 determines that the device needs to be moved into another position in order for the device to capture an image representation of scene that includes an interest region of the size, shape and position required. For example, if the most recently captured image map representation of a scene does not include pixels required to represent the interest region, then control circuit 40 may issue a command to a component such as output 14*a* or output 14*d* of device 10 which emits a tone or other understandable indicator such as a display graphic or text instructions to a user to move the device away from the target in order to expand the device's field of view. Control circuit 40 can be configured to emit audible or visual indicators that correspond to the direction (x, y, or z axis) in which the device should be moved in order to capture an image of sufficient characteristics to include interest region 8R.

After the captured image of the interest region is output at block 125, controller 40 proceeds to block 146 and outputs the encoded message of remaining data encoded in indicia 6, if any. Image reading instruction indicia 6 may include an encoded message or else may include no encoded message other than a data corresponding to parsing mode commencement and operation parameter indicators and may be provided only to cause and possibly control aspects of an image data read in accordance with the invention.

If at block 121, the control circuit 40 determines that an indicia in the field of view of device 10 is not an image reading instruction indicia then control circuit 40 proceeds to block 145 and, in accordance with the specific device operating program shown, may determine whether the indicia is a menu symbol bar code. A device in which the invention may be incorporated may include a menuing feature whereby aspects of device control can be altered by reading specialized menu bar code. Menu symbol bar codes include a special flag which indicates to the device that the indicia being read is a menu bar code. In the case that a menu bar code is read, controller 40 proceeds to block 160 and executes a menu routine. Menu bar codes are described in detail in an issued patent entitled "Optical Devices Having Improved Menuing Features," identified by U.S. Pat. No. 5,975,736, and incorporated by reference herein. As described in that reference, menu symbol bar codes can be used to configure or reconfigure imaging device 10 by establishing or changing operating parameters of device 10 without use of a keyboard. In the alternative, as indicated by FIGS. 2*a*–2*f*, an imaging device for use with the invention can be configured or reconfigured by, for example, entering appropriate commands via keyboard 13*k* or keyboard in communication with control circuit such as keyboard 68*k*.

In the specific embodiments illustrated thus far, image reading instruction indicia 6 is provided by a standardly known bar code symbol. Using a standardly known bar code symbol as an image reading instruction indicia provides a variety of advantages. Most notably, imaging devices are commonly equipped with the capacity to read and decode messages encoded in standardly known bar code symbols. Accordingly, using a standardly known bar code symbol enables the image parsing operations required of the invention to be provided with minimal modification of a standardly known device. Further, by using standardly known bar codes, complex and lengthy parsing mode operating instructions, in the form of data processing and output parameters can be incorporated and encoded directly in an image reading instruction indicia 6.

However, in certain applications it may be undesirable to utilize a standardly known bar code symbol, e.g. indicia 6-1, as an image reading instruction indicia of system 2. In certain applications, utilizing a bar code symbol as an image reading instruction symbol may be considered aesthetically undesirable. Accordingly in certain applications, it may be desirable to utilize decodable or recognizable symbols other than standardly known bar code symbols as image reading instruction symbols of image reading system 2. Embodiments which employ recognizable symbols other than standardly known bar code symbols as image reading instruction indicia according to the invention are described with reference to FIGS. 6*a*–6*g*.

Figure 6A:
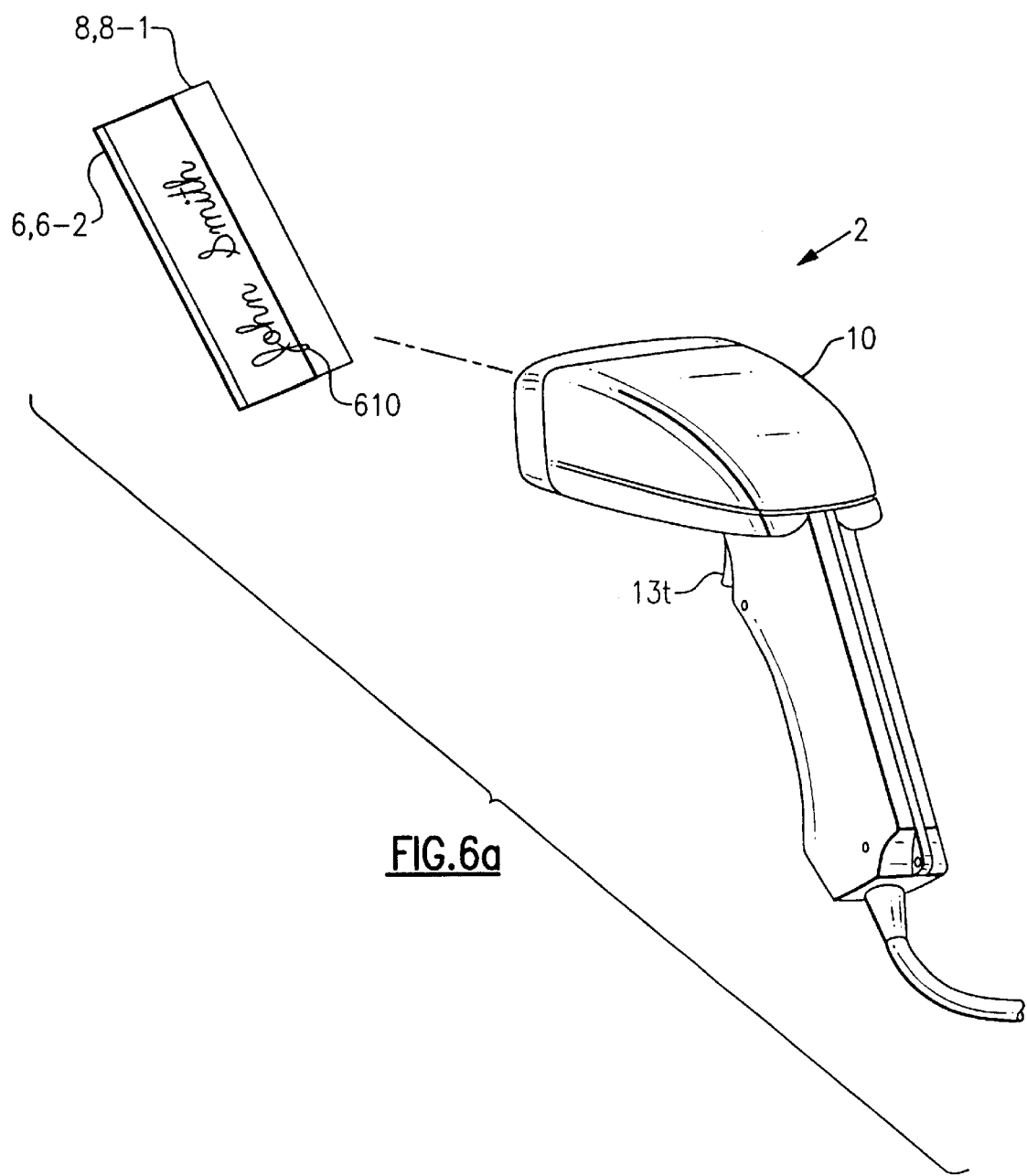
FIGS. 6a–6g illustrate specific examples of the invention in which an image reading instruction indicia is provided by a symbol other than a bar code.

In the embodiment of FIG. 6*a*, it is seen that image reading instruction indicia 6 can be provided by a simple box 6, 6-2. In the embodiment of FIG. 6*a*, device 10 is configured to recognize signature box 6, 6-2 as an image reading instruction symbol of the first, second, or third type described herein. Accordingly, device 10 when reading and recognizing box 6, 6-2 commences operation in an image capture mode and processor to parse out image data from an interest region of a captured image corresponding to an interest area 8-1 of a real image comprising indicia 6-2. The interest region corresponding to a signature box image reading instruction indicia is conveniently configured to extend beyond the boundaries of the box image representation to encompass portions of a signature, such as portion 610 extending beyond the boundaries of 6-2 box.

Figures 6B, 6C:
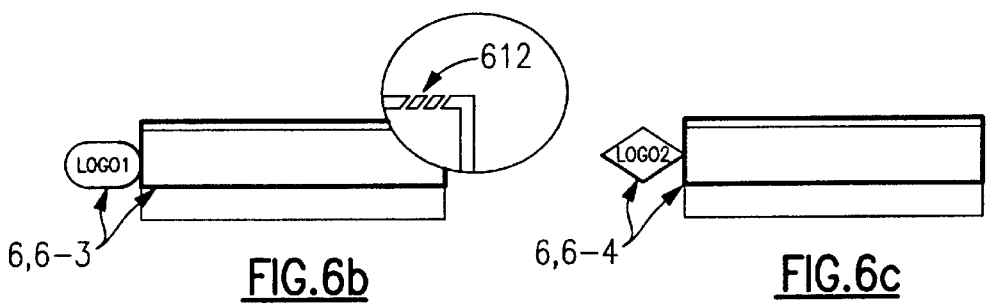

It may advantageous to add graphical features to signature box 6-2 to render it more easily recognized by device 10 and possibly render it more easily distinguishable from other image reading instruction indicia comprising signature boxes. The embodiments of FIGS. 6*b* and 6*c* illustrate that logos can be added to instruction indicia comprising signature boxes to render signature boxes distinguishable from one another. Signature box 6, 6-3 comprises a logo of a first style while box 6, 6-4 comprises a logo of a second style so that device 10 can be readily configured to distinguish between the styles and can readily determine orientation of the signature box. According to another method for providing boxes so that they may be distinguished from one another and so that an orientation of a signature box can readily be determined, bar space pattern can be encoded in the lines of a box as is indicated by bar space pattern of box 612. It will be seen that signature boxes, e.g. 6-2, 6-3 and 6-4 could readily be substituted for by signature lines. However, as will be explained further herein image distortion can normally more accurately be corrected for in images comprising signature box image reading instruction indicia than signature line image reading instruction indicia.

Figures 6D, 6E:
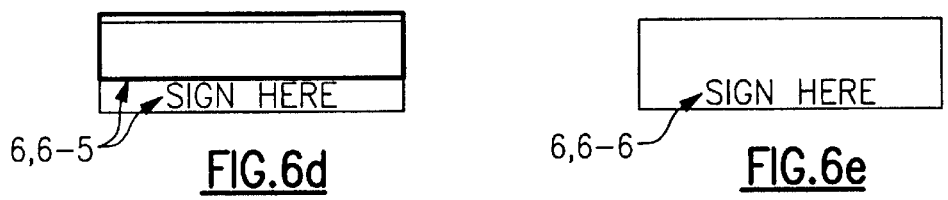

By image reading instruction indicia 6-5 of FIG. 6*d* it is seen that an image reading instruction indicia of the invention can be provided by a signature box in combination with a text string. By image reading indicia 6, 6-6 of FIG. 6*e* it is seen that an image reading instruction indicia can be provided by a text string only without an associated signature box or line. When an image reading instruction indicia includes a text string, e.g. indicia 6-5 or 6-6 device 10 may recognize the text string as an image reading instruction indicia by recognition of graphical features of the indicia or by recognition of a decoded OCR message decoded from the text string. That is, device 10 may be configured so that decoding of the text message "sign here" may result in an image parsing mode being commenced.

Figure 6F:
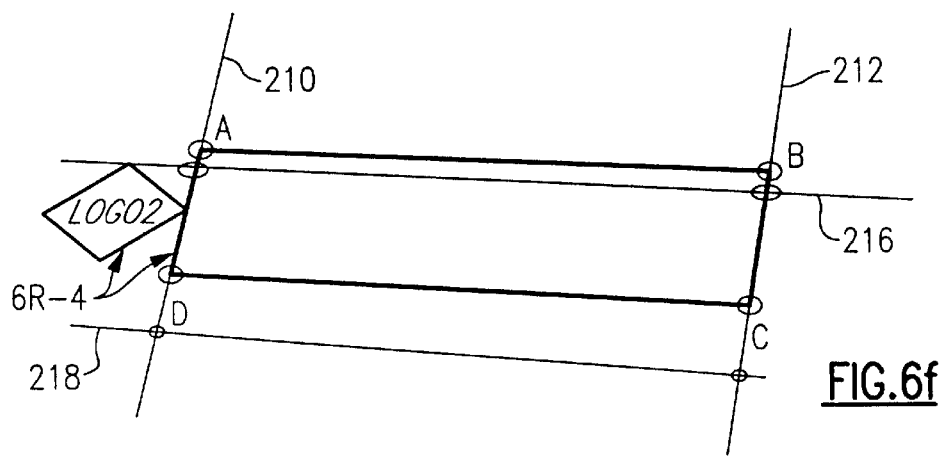
Figure 6G:
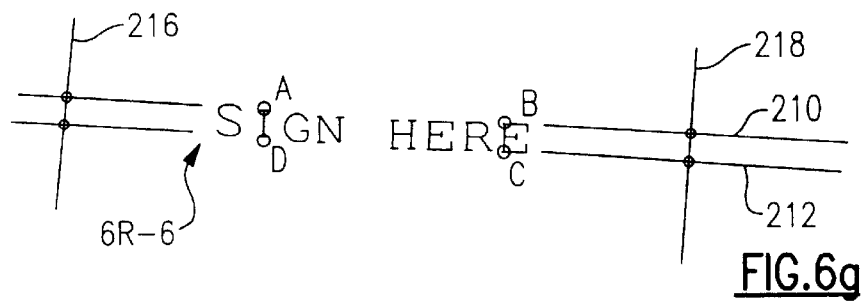

FIGS. 6*f* and 6*g* are image representations illustrating distortion correction methods in the case that an image reading instruction indicia 6 of the invention comprises a symbol other than a standardly known bar code. FIG. 6*f* illustrates an image representation corresponding to image reading instruction indicia 6-4 shown in FIG. 6c while FIG. 6g illustrates an image representation corresponding to image reading instruction indicia 6-6 shown in FIG. 6e. The image representation of FIG. 6f includes indicia representation 6R-4 corresponding to indicia 6-4 while the image representation of FIG. 6g includes indicia representation 6R-6 corresponding to indicia 6-6.

Distortion correction in the case indicia 6 comprises a symbol other than a bar code symbol can proceed in the manner of the interpolated grid line distortion correction method described with reference to FIGS. 4b and 4c. Grid lines 210 and 212 in the embodiment of FIGS. 4b and 4c can be established in the in the manner of grid lines 210 210 in the embodiment of FIGS. 4b and 4c while boundary grid lines 216 and 218 can be established in the manner of grid lines 216 and 218 of FIGS. 4b and 4c. Similarly, grid lines 210 and 214 in the embodiment of FIG. 6g can be established in the manner of grid lines 210 and 212 on the embodiment of FIGS. 4b and 4c while boundary grid lines 216 and 218 can be established in the manner of grid lines 216 and 218 of FIGS. 4b and 4c. For establishing of distortion correction grid lines, image reading indicia 6 should have sufficient graphical information so that either a pair of substantially parallel or substantially perpendicular grid lines could be established based on graphical features of the indicia in a zero distortion image representation corresponding to the image reading instruction indicia. In the example of FIG. 6f grid lines are based on corner points of signature box 6-4. In the example of FIG. 6g grid lines 210 and 212 are based on corner points of the characters "I" and "E" respectively.

Operating parameters cannot be encoded in non-standardly known bar code image reading instruction indicia, e.g. indicia 6-2, 6-3, 6-4, 6-5 and 6-6 as easily as in bar code image reading indicia, e.g. indicia 6-1. Accordingly, if it desired to have indicia dependant image parsing modes, image reading instruction indicia 6 provided by symbols other than standardly known bar code symbols can be configured in accordance with the image reading instruction indicia of the second type described herein. When reading image reading instruction indicia of the second type, device 10 may execute an image parsing mode of operation in accordance with operating parameters that are called up from a lookup table (LUT).

The partial contents of a LUT 710 for controlling operation of a device operating in an image parsing mode of operation in a manner that depends on an identifier of an image reading indicia is shown in FIG. 7. Control circuit 40 calls up operating parameters from LUT 710 in accordance with an identifier of indicia 6. Column 712 of LUT 710 lists several styles of non-bar code image reading instruction indicia as described in connection with FIGS. 6a–6g. LUT 710 further comprises a different row of operating parameters for each style of indicia. An identifier for a particular style of indicia may be any feature of the indicia that distinguishes it from another indicia. Operating parameters may be image reading parameters, e.g. parameters from column 714 which determine the manner in which image data is processed from a starting image representation and image output parameters, e.g. parameters from column 716, which determine the manner in which a parsed interest region image representation is output.

In the embodiment described in connection with FIG. 3a, an image parsing mode of operation is commenced during the course of operating a bar code decoding mode. Reading of an image reading instruction indicia 6 of the first, second, or third type during the course of operating in a decoding mode herein causes automatic branching of device 10 into an image parsing mode.

However, under certain circumstances, it may be desirable to commence an image parsing mode of operation in response to an action other than reading an image reading instruction indicia having a parsing mode commencement indicator. The fourth type of image reading instruction indicia described herein does not include an image parsing commencement indicator. When executing an image parsing mode in associated with an image reading instruction indicia of the fourth type, device 10 processes image data in a manner that depends on features of indicia 6. However, the command to commence the image parsing process is provided by an act other that the reading of a parsing mode commencement indicator of an instruction indicia 6. For example, device may commence an image parsing instruction mode in response to a user initial command initiated via a user interface such as keyboard 13k or keyboard 68k.

A flow diagram illustrating operation of an imaging device operating in an image parsing mode in association with an image reading instruction indicia of the fourth type is shown in FIG. 3b. The loop designated by decision block 810 indicates that a user initiated image parsing mode will not be executed until control circuit 40 receives a user initiated instruction to execute an image parsing routine. A user may initiate an image parsing mode at block 810 by entering an appropriate command, for example, via keyboard 13k integral with device 10 or another control, device in communication with imaging device 10, such as a keyboard 13k or mouse 13m of nonintegrated local host processor system assembly 68.

In general, when used to decode bar codes, control circuit 40 is preferably configured to store into a buffer memory location, for each decoded bar code, the decoded message for the bar code, imaging characteristics for the bar code, and the complete image representation that includes a representation of the decoded bar code.

Therefore, in accordance with one embodiment of an image parsing mode, control circuit 40 at block 812 may retrieve from a buffer memory location, e.g. memory 45 imaging characteristics pertaining to the last decoded bar code. For decoding a bar code, control circuit 40 will often determine such imaging characteristics for a bar code including for example a scaling characteristic, an orientation characteristic or a distortion characteristic for the bar code. These characteristics in some circumstances can be expressed in terms of a numerical quantity. In other circumstances they may be expressed in terms of graphical data. For example, a distortion characteristic for the bar code image representation shown in FIGS. 4b and 4c is expressed in terms of a set of distortion correction grid lines.

At block 814 control circuit 40 applies the imaging characteristics for the decoded bar code retrieved at block 812 to parse interest region image data from the last image representation corresponding to a decoded message. The interest region size and relative location is determined prior to the time the image representation acted on in block 814 is captured. However, control circuit 40 at block 812 preferably scales image data of an interest region, orients image data of an interests region and corrects for distortion of an interest region in accordance with imaging characteristics (retrieved at block 812) determined for bar code representation contained within the image acted on at block 814.

As indicated, the archived image representation subjected to parsing at block 814 and the imaging characteristics utilized at block 814 are conveniently determined from the mode recently captured image representation captured by device 10. This data is routinely stored in buffer memory locations. However, control circuit 40 at block 812 may parse image data from an image representation other than the most recently captured image captured by control circuit 40. For example, control circuit 40 may upload several frames of captured image data to a nonintegrated local host processor system provided by a personal computer as is indicated by the communication system 67 shown in FIG. 3e, which has been previously programmed to catalog frames of image data. A user may then initiate control via keyboard of 68k and mouse 68m of host processor assembly 68 to "flip" through several frames of image data as displayed on monitor 68d. The image parsing mode may be carried out by host processor system 70s on a frame selects by a user using host processor system 70s.

Image reading indicia of the fourth type described herein used in connection with the user initiated image parsing mode, may be of any style described herein, e.g. bar code, box, box+logo, line, text string etc. However, when indicia 6 is of the fourth type for use in conjunction with a user-initiated image parsing mode, image reading instruction indicia 6 is preferably provided by a bar code symbol. The reason for this preference is that imaging device 10, as part of its normal operation in decoding a bar codes has already determined imaging characteristics for the decoded code at the time a user-initiated instruction to commence an imaging parsing mode as received at block 810. Therefore, at block 812 of the user uninitiated image capture mode described with reference to FIG. 3b, control circuit 40 does not have to determine imaging characteristics for a graphical indicia of anew. Although control circuit 40 could of course be programmed to calculate imaging characteristics for an image reading instruction indicia anew at block 812, control circuit 40 at block 812 preferably merely reads such data from a last frame buffer memory location associated with control circuit 40. Utilizing a bar code as an image reading instruction indicia 6 also allows more information to be encoded in the bar code. If an image reading instruction indicia of the first type is provided by a linear bar code, for example, a substantial amount of the information storage capacity for the linear bar code must be devoted to encoding image parsing mode operation parameters. If the linear bar code is an image reading indicia of a fourth type which controls image parsing only to the extent control circuit determines imaging characteristics for the indicia in the location of the indicia, then all of the information storing capacity of linear bar code can be devoted to storing information other than information which controls the image parsing process. With reference further to the flow diagram of FIG. 3b, control circuit 40 at block 816 outputs a parsed interest region image region. As explained with reference to FIGS. 4b and 4c, the parsed image data may comprise interpolated pixel values interpolated by a grid line distortion correction method. The parsed image data may also comprise a subset of original pixel values of a full frame of image data captured by control circuit 40. The outputting of parsed image may comprise, for example, the storage of parsed image data into memory 45 for later use, or the uploading of parsed image data to a nonintegrated host processor assembly such as processor assembly 68 or processor assembly 88-1. Parsed image data is often attached to other information. For example, in a scene having a decodable bar code and an image reading indicia provided by the bar code, it is common to associate the parsed image data from the scene with a decode message from the bar code.

Figure 8A:
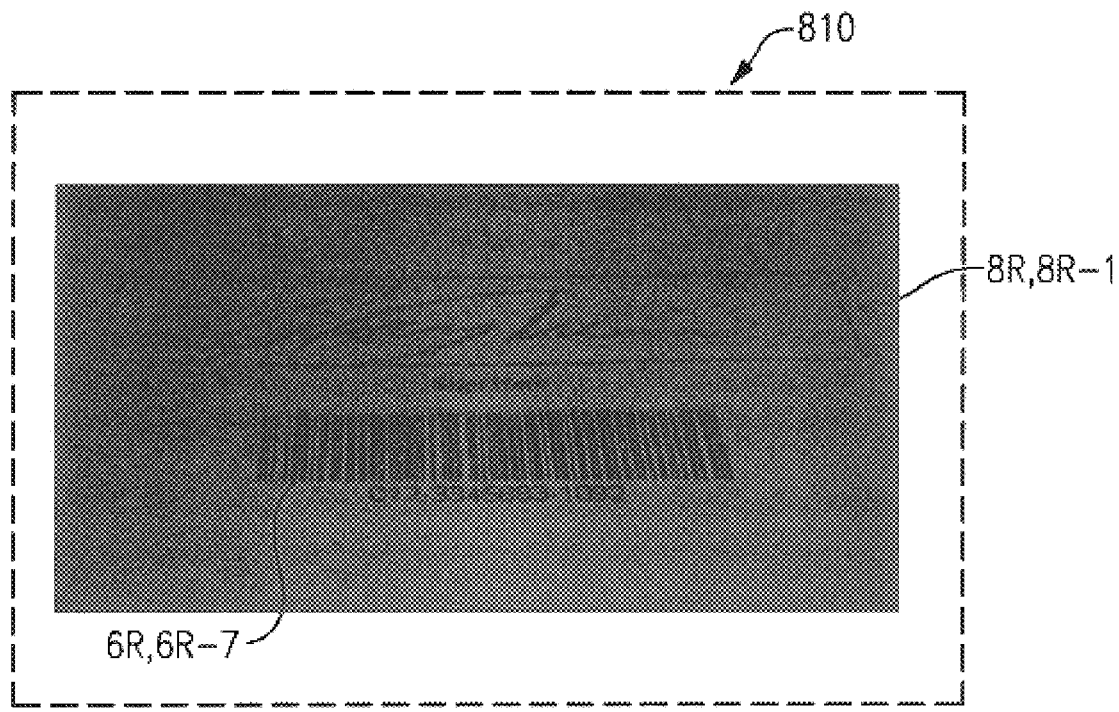
FIGS. 8a–8b show a full frame image representation and parsed image data parsed from the full frame image representation.
Figure 8B:
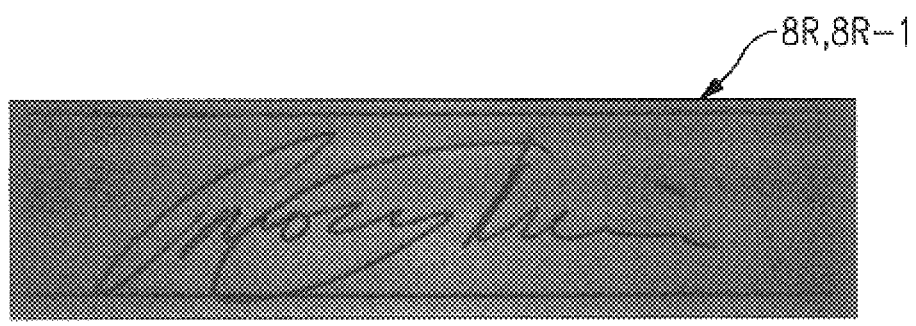

An example illustrating the results obtaining by operation of an image parsing mode according to the invention is described with reference to FIGS. 8a and 8b. FIG. 8a illustrates a full frame of image data 810 captured by control circuit 40, while FIG. 8b illustrated parsed interest region image data 8R corresponding to an interest region 8R of full frame 810. It is seen that control circuit 40 in outputting parsed image data corresponding to a signature changes the orientation and scaling of the image data of interest region 8R, and corrected for distortion of image data in interest region 8R. Image reading instruction indicia representation 6R and 6R-7 in the image shown in FIG. 8a may correspond to an image reading instruction indicia of the first, second, third, or fourth type described herein.

Specific examples of the invention showing scenes having image reading instruction indicia and interest areas correlated with output interest region parsed image data corresponding to the interest area(s) of the scenes are described with reference to FIGS. 9a–9j. Importantly, interest areas of scenes can comprise markings other than signatures. Further, there is often more than one interest area 8 for a given image reading instruction indicia 6.

In the example of FIGS. 9a and 9b, wherein FIG. 9a illustrates a scene comprising shipping label 910 and wherein FIG. 9b illustrates parsed interest region image data parsed from an image representation of label 910, image reading instruction indicia 6, 6-8 comprises a PDF bar code symbol, and there are three interest areas corresponding to indicia 6-8. First interest area 8 and 8-2 comprise a marking indicating the number of items shipped, second interest area 8 and 8-2 comprise a marking indicating a job number, third interest 8 and 8-1 comprise a signature field while fourth interest area 8 and 8-4 comprise handwritten characters. FIG. 9b illustrates an example of an output format for outputting parsed image data from an image representation corresponding to label. First interest region 8R and 8R-2 is parsed image data corresponding to first interest area 8 and 8-2, second interest region 8R and 8-3 is parsed image data corresponding to interest area 8 and 8-3, third interest region 8R and 8R-1 is parsed image data corresponding to interest area 8 and 8-1 while fourth interest region 8R and 8R-4 comprise parsed image data corresponding to interest area 8 and 8-4.

Figure 9C:
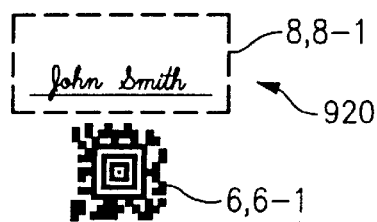

Further examples illustrating the invention are described with reference to FIGS. 9c–9j. With reference to the example of FIGS. 9c and 9d, FIG. 9c illustrates a scene 920 comprising an image reading instruction indicia 6 and 6-1 and interest area 8 and 8-1 while FIG. 9d illustrated parsed image data illustrated in an image data parsed from an image representation of scene 920. Interest region 8R and 8-1 of FIG. 9d comprises parsed image data corresponding to interest area 8 and 8-1 of scene 920.

Figure 9E:
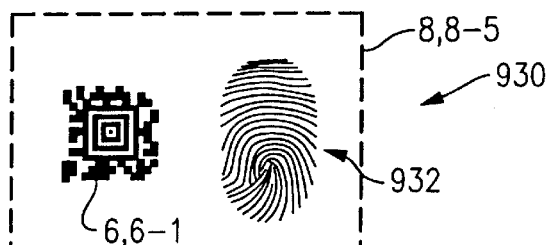
Figure 9D:
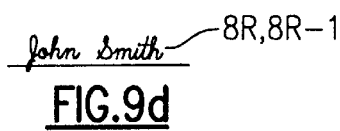
Figure 9F:
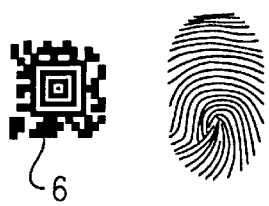

FIGS. 9e–9h illustrate the invention applied as to fingerprint parsing applications. FIG. 9e shows a scene 930 having an image reading instruction indicia 6 and 6-1 and a fingerprint 932 withing interest area 8-5, while FIG. 9f illustrates parsed image data parsed from an image representation corresponding to scene 930. Parsed image data shown in FIG. 9f comprises interest region image data8R and 8R-5 corresponding to interest area 8-5 of scene 932. The embodiment of FIGS. 9e and 9f illustrate that an interest area 8 of a scene can include an image reading instruction indicia 6.

Figure 9G:
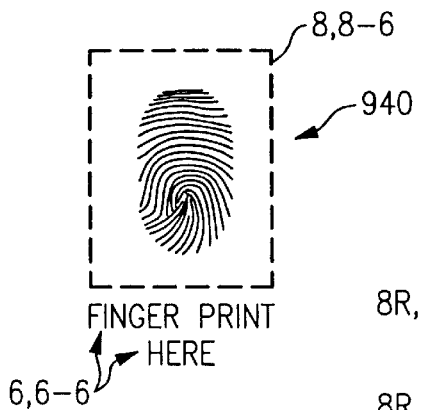
Figure 9I:
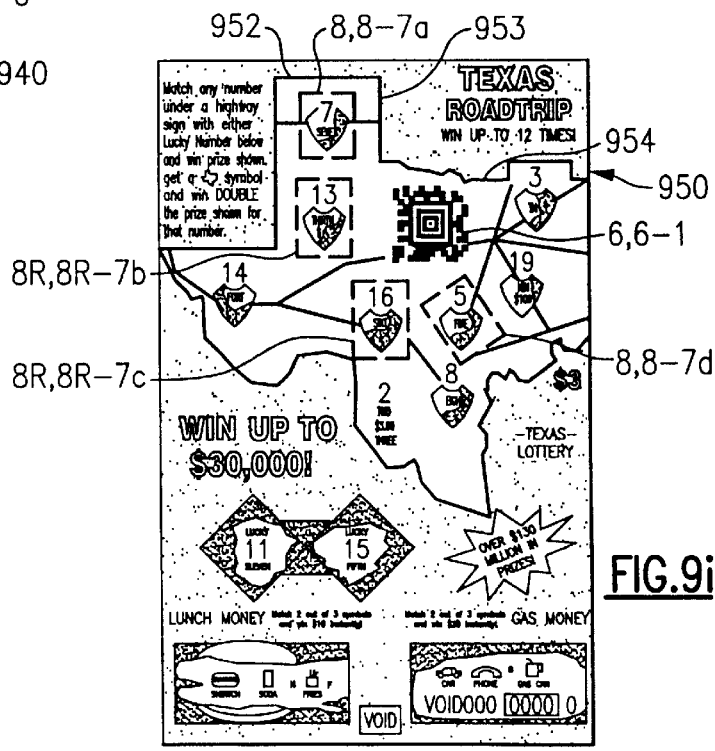
Figure 9H:

FIGS. 9g and 9h illustrate another embodiment of the invention as applied to a fingerprint parsing application. FIG. 9g shows a scene 940 having an image reading instruction indicia 6 and 6-6 and an interest area 8 and 8-6, while FIG. 9h illustrates parsed image data parsed from an image representation corresponding to scene 940. In the embodiment of FIG. 9g and 9h image reading instruction indicia 6-6 is provided by a string of text characters, and the interests region 8R and 8R-6 of parsed image data corresponds to interest area 8-6 includes a fingerprint representation but does not include a representation of any part of the image reading indicia 6-6.

Figure 9J:
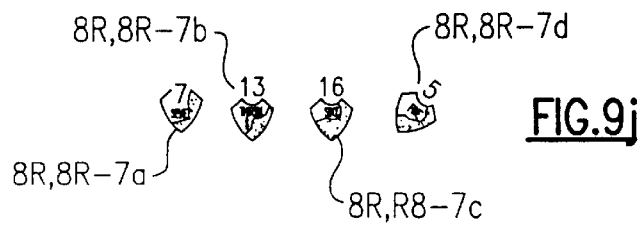

FIGS. 9i and 9j illustrate the invention as applied in a lottery game ticket reading application. FIG. 9i illustrates a scene comprising a lottery game ticket 950 carrying an image reading instruction indicia 6 and 6-1 and having interest areas 8-7a, 8-7b, 8-7c and 8-7d, while FIG. 9j shows parsed image data parsed from an image representation corresponding to ticket 950. In a possible output format, control circuit 40 outputs parsed image data in the format shown by FIG. 9j. In the parsed image data of FIG. 9j, interest region 8R-7a corresponds to interest area 8-7a, interest region 8R-7b corresponds to interest area 8-7b interest region 8R-7c corresponds to interest area 8-7c and interest region 8R-7d corresponds to interest area 8-7d of the scene comprising lottery game ticket 950. In the example of FIG. 9i, image reading instruction indicia 6-1 is provided by a bar code. However, it will be understood that control circuit 40 could be configured to recognize other graphical features of lottery game ticket 950 and an image reading instruction indicia according to the invention. For example, control circuit 40 could be configured to recognize the combination of graphic line segments 952, 953, and 954 as an image reading indicia 6 according to the invention, and could further be configured to correct for distortion while parsing image data from an image representation of ticket 950 by establishing distortion correction grid lines based on perpendicularly oriented line segments 952 and 953.

An important advantage of the present invention in certain embodiments is that developed interest region image representation can be output to actual size, to a proper orientation, and with distortion of the captured image corrected, regardless of the distance, orientation, or angle of a device to an image reading instruction indicia formed in accordance with the invention, and regardless the position of the indicia 6 in relation to a scene desired to be subjected to image capture and image parsing.

While the present invention has been described with reference to a number of specific embodiments in order to set forth the best mode thereof, it will be understood that the sprit and scope of the present invention should be determined with reference to the following claims.

What is claimed is:

1. A system for processing an image representation of a scene, said system comprising:
an image reading instruction indicia disposed in said scene; and
an imaging device for capturing said image representation, said imaging device having a control circuit configured to:
capture an image representation of said scene including said image reading instruction indicia;
determine at least one of a scaling characteristic, orientation characteristic or distortion characteristic of a region of said image representation representing said image reading instruction indicia; and
parse image data from said image representation using at least one of said determined scaling, orientation, or distortion characteristics.

2. The system of claim 1, wherein said image reading instruction indicia comprises a signature box.

3. The system of claim 1, wherein said image reading instruction indicia comprises a signature box coupled with a logo.

4. The system of claim 1, wherein said image reading instruction indicia comprises a signature box coupled with a string of text characters.

5. The system of claim 1, wherein said image reading instruction indicia comprises a string of text characters.

6. The system the claim 1, wherein said image reading instruction indicia comprising an image parsing mode commencement indicator, which when read by said control circuit causes said device to operate in an image parsing mode.

7. The system of claim 1, wherein said control circuit determines a distortion characteristic for said image representation region corresponding to said image reading instruction indicia by a process including the step of establishing grid lines based on graphical features of said image reading instruction indicia.

8. The system of claim 1, wherein said control circuit determines a distortion characteristic for said image representation region corresponding to said image reading instruction indicia by a process including the step of establishing grid lines based on graphical features of said image reading instruction indicia, and wherein said image reading instruction indicia includes graphical features sufficient to enable said control circuit to establish a pair of grid lines that are essentially parallel to one another or essentially perpendicular to one another when said image representation is essentially distortion free.

9. The system of claim 8, wherein said image reading instruction indicia includes a signature box, and wherein said control circuit establishes distortion correction grid line based on said image representation region corresponding to corners of said signature box.

10. The system of claim 8, wherein said image reading instruction indicia includes a string of text characters, and wherein said control circuit establishes distortion correction grid lines based on graphical features of said image representation region corresponding to at least one specific character within said string of text characters.

11. A method for processing image data using an imaging device having bar code decoding capability, said method comprising the steps of:
capturing an image representation of a scene that includes a bar code;
determining at least one imaging characteristic for said bar code;
storing said image representation and data corresponding to said at least one imaging characteristic in respective buffer memory locations;
receiving a command from a user to initiate an image parsing mode, and while in said image parsing mode, and while in said image parsing mode, retrieving from said buffer memory locations said image representation and said data corresponding to at least one imaging characteristic; and
using said data corresponding to at least one imaging characteristic in parsing image data from said image representation.

12. The method of claim 11, wherein said at least one imaging characteristic is a scaling characteristic.

13. The method of claim 11, wherein said at least one imaging characteristic is an orientation characteristic.

14. The method of claim 11, wherein said at least one imaging characteristic is a distortion characteristic.

15. The method of claim 11, wherein said image parsing mode is executed using nonintegrated processor assembly in communication with said device.

16. The method of claim 11, wherein said image parsing mode is initiated via a keyboard of said imaging device.

17. The method of claim 11, wherein said image parsing mode is initiated via a keyboard or mouse of a nonintegrated processor assembly in communication with said device.

18. The method of claim 11, wherein said bar code is of a type that does not comprise an image parsing mode commencement indicator.

19. The method of claim 11, wherein in said image parsing mode, image data is developed corresponding to more than one interest region of said image representation.

20. The method of claim 11, wherein said storing step includes the step of storing distortion correction grid line data based on said bar code representation, and wherein said retrieving step includes the step of retrieving said distortion correction grid line data.

* * * * *